US012779653B2

(12) United States Patent
Li et al.

(10) Patent No.: US 12,779,653 B2
(45) Date of Patent: Nov. 3, 2026

(54) POWER TOOL

(71) Applicant: Nanjing Chervon Industry Co., Ltd., Nanjing (CN)

(72) Inventors: Chunrui Li, Nanjing (CN); Shubin Tong, Nanjing (CN); Hanqing Zheng, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 40 days.

(21) Appl. No.: 18/641,608

(22) Filed: Apr. 22, 2024

(65) Prior Publication Data

US 2024/0269819 A1 Aug. 15, 2024

Related U.S. Application Data

(63) Continuation of application No. PCT/CN2022/128557, filed on Oct. 31, 2022.

(30) Foreign Application Priority Data

Dec. 8, 2021 (CN) ......................... 202111491080.1
May 26, 2022 (CN) ......................... 202210582388.5
May 26, 2022 (CN) ......................... 202210582452.X

(51) Int. Cl.
*B25F 5/00* (2006.01)
*B25D 11/06* (2006.01)
*F16H 1/46* (2006.01)

(52) U.S. Cl.
CPC ............ *B25F 5/001* (2013.01); *B25D 11/064* (2013.01); *B25D 2250/095* (2013.01);
(Continued)

(58) Field of Classification Search
CPC ...... B25F 5/001; B25D 2250/301; F16H 1/46
See application file for complete search history.

(56) References Cited

U.S. PATENT DOCUMENTS

2014/0080659 A1* 3/2014 Elger ...................... B25F 5/001 475/337
2019/0301571 A1 10/2019 Tesar
(Continued)

FOREIGN PATENT DOCUMENTS

CN 1370661 A 9/2002
CN 1950627 A 4/2007
(Continued)

OTHER PUBLICATIONS

Metabo Catalog (Year: 2020).*
(Continued)

*Primary Examiner* — Daniel Jeremy Leeds
(74) *Attorney, Agent, or Firm* — Greenberg Traurig, LLP

(57) ABSTRACT

A power tool includes a transmission mechanism provided with transmission gears for making an output shaft output different rotational speeds, where the number of transmission gears is greater than or equal to 3; the transmission mechanism includes multi-stage planetary gear sets; each stage of the multi-stage planetary gear sets includes one layer of planet gears in an axial direction; the total number of the multi-stage planetary gear sets is less than or equal to the number of transmission gears; and among the multi-stage planetary gear sets in the multiple stages, a first-stage planetary gear set closest to a motor shaft includes a first drive state and a first variable state, and any one of the remaining planetary gear sets is connected to a clutch mechanism.

19 Claims, 23 Drawing Sheets

(52) U.S. Cl.
CPC .. *B25D 2250/165* (2013.01); *B25D 2250/301* (2013.01); *F16H 1/46* (2013.01)

(56) References Cited

U.S. PATENT DOCUMENTS

| | | | | |
|---|---|---|---|---|
| 2020/0238483 | A1* | 7/2020 | Kamiya | B25B 21/00 |
| 2021/0170564 | A1* | 6/2021 | Gehret | F16H 3/663 |

FOREIGN PATENT DOCUMENTS

| | | | |
|---|---|---|---|
| CN | 102335906 | A | 2/2012 |
| CN | 202192605 | U | 4/2012 |
| CN | 103261737 | A | 8/2013 |
| CN | 205703930 | U | 11/2016 |
| CN | 106246835 | A | 12/2016 |
| CN | 108953539 | A | 12/2018 |
| CN | 109834657 | A | 1/2021 |
| CN | 113858134 | A | 12/2021 |
| DE | 102016201225 | A1 | 1/2017 |
| JP | H1137226 | A | 2/1999 |
| JP | 2009125910 | A | 6/2009 |
| JP | 2013000847 | A | 1/2013 |
| WO | 2022002061 | A1 | 1/2022 |

OTHER PUBLICATIONS

Metabo Catalog Part 2 (Year: 2020).*
Metabo Catalog Part 1 (Year: 2020).*
International Search Report of international application No. PCT/CN22/128557, dated Jun. 15, 2023, 10 pp.

* cited by examiner

POWER TOOL

RELATED APPLICATION INFORMATION

This application is a continuation of International Application Number PCT/CN2022/128557, filed on Oct. 31, 2022, through which this application also claims the benefit under 35 U.S.C. § 119(a) of Chinese Patent Application No. 202111491080.1, filed on Dec. 8, 2021, Chinese Patent Application No. 202210582388.5, filed on May 26, 2022, and Chinese Patent Application No. 202210582452.X, filed on May 26, 2022, which applications are incorporated herein by reference in their entireties.

TECHNICAL FIELD

The present application relates to a power tool, for example, a rotary power tool.

BACKGROUND

As a type of power tool, rotary power tools are typically operated by users through their rotational output torque. To increase torque, a reduction gearbox is generally disposed between an electric motor and an output shaft to implement the function of reduction and torque increase. During use, to adapt to more working conditions, the rotary power tools are required to be capable of outputting various magnitudes of torque.

For products in the related art, the output of multiple rotational speeds is generally implemented in the following functional manner: a gear ratio of multiple stages of reduction gears is changed. The above manner generally requires the use of reduction gears the number of which is greater than the number of required output gears, which causes a larger length of a gearbox and is not conducive to the miniaturization and compactness of the products.

Therefore, how to balance the output of rotational speeds in more gears and more miniaturized products is an urgent technical problem to be solved in the art.

SUMMARY

A power tool includes an electric motor including a motor shaft rotating about a first axis; an output mechanism including an output shaft rotating about an output axis and configured to output power; a transmission mechanism configured to transmit power between the electric motor and the output mechanism; and a clutch mechanism configured to, when torque transmitted from the output shaft to the transmission mechanism exceeds a set threshold of output torque of the power tool, prevent the output shaft from being driven through the transmission mechanism. The transmission mechanism is provided with transmission gears for making the output shaft output different rotational speeds, where the number of transmission gears is greater than or equal to 3. The transmission mechanism includes multi-stage planetary gear sets, each stage of the multi-stage planetary gear sets includes one layer of planet gears in an axial direction, and the total number of the multi-stage planetary gear sets is less than or equal to the number of transmission gears. It is defined that when a gear ratio of a planetary gear set is basically 1, the planetary gear set is in a drive state, and when the gear ratio of the planetary gear set is greater than or less than 1, the planetary gear set is in a variable state. Among the multi-stage planetary gear sets, a first-stage planetary gear set closest to the motor shaft includes a first drive state and a first variable state, and any one of the remaining planetary gear sets is connected to the clutch mechanism.

A power tool includes an electric motor including a motor shaft rotating about a first axis; an output mechanism including an output shaft rotating about an output axis and configured to output power; and a transmission mechanism configured to transmit power between the electric motor and the output mechanism. The transmission mechanism is provided with transmission gears for making the output shaft output different rotational speeds, where the number of transmission gears is greater than or equal to 3. The transmission mechanism includes multi-stage planetary gear sets, and each stage of the multi-stage planetary gear sets includes at least one layer of planet gears in an axial direction. Among the multi-stage planetary gear sets, a first-stage planetary gear set closest to the motor shaft includes multiple first planet gears and a first inner ring gear meshing with the multiple first planet gears, and the first inner ring gear is configured to move between a first position and a second position, where when the first inner ring gear is at the first position, the first inner ring gear is prevented from rotating and a gear ratio of the first-stage planetary gear set is not equal to 1.

A power tool includes an electric motor including a motor shaft rotating about a first axis; an output mechanism including an output shaft rotating about an output axis and configured to output power; and a transmission mechanism configured to transmit power between the electric motor and the output mechanism. The transmission mechanism is provided with transmission gears for making the output shaft output different rotational speeds. The transmission mechanism includes multi-stage planetary gear sets, where each stage of the multi-stage planetary gear sets includes planet gears, and it is defined that when a gear ratio of a planetary gear set is basically 1, the planetary gear set is in a drive state, and when the gear ratio of the planetary gear set is greater than or less than 1, the planetary gear set is in a variable state; and a first cover configured to accommodate a first bearing supporting the motor shaft. Among the multi-stage planetary gear sets, a first-stage planetary gear set closest to the motor shaft includes a first drive state and a first variable state, and the first-stage planetary gear set includes multiple first planet gears and a first inner ring gear meshing with the multiple first planet gears, where when the first-stage planetary gear set is in the first variable state, the first inner ring gear is prevented from rotating by a locking portion disposed on the first cover, and when the first-stage planetary gear set is in the first drive state, the locking portion releases the first inner ring gear.

DETAILED DESCRIPTION

The present application is described below in detail in conjunction with the drawings and examples.

In the description of the present application, terms "joined", "connected", and "fixed" are to be understood in a broad sense unless otherwise expressly specified and limited. For example, the term "connected" may refer to "fixedly connected", "detachably connected", or integrated, may refer to "mechanically connected" or "electrically connected", or may refer to "connected directly", "connected indirectly through an intermediary", "connected inside two elements", or an "interaction relation between two elements". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

Figure 1:
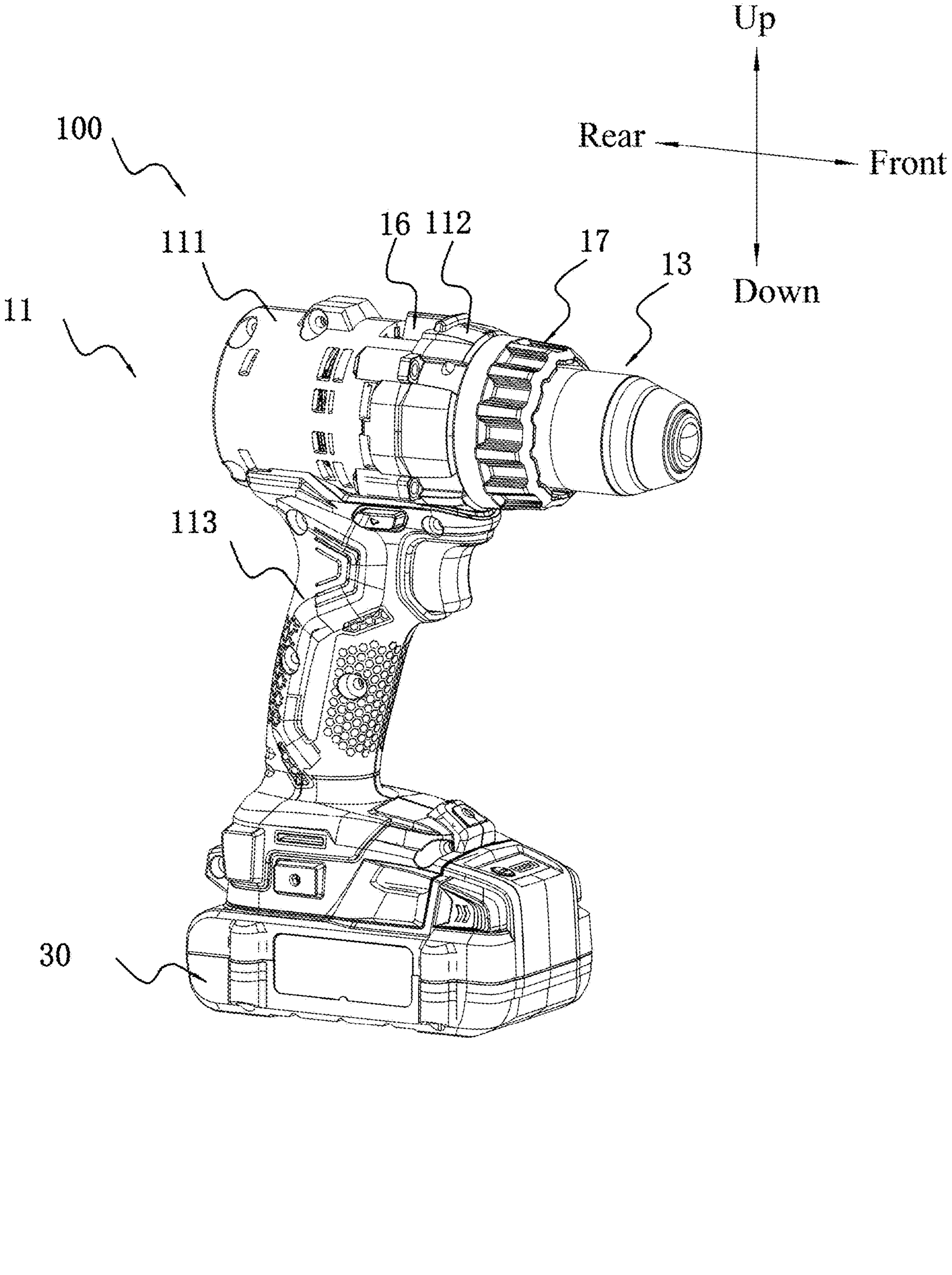
FIG. 1 is a structural view of a first example of the present application.
Figure 2:
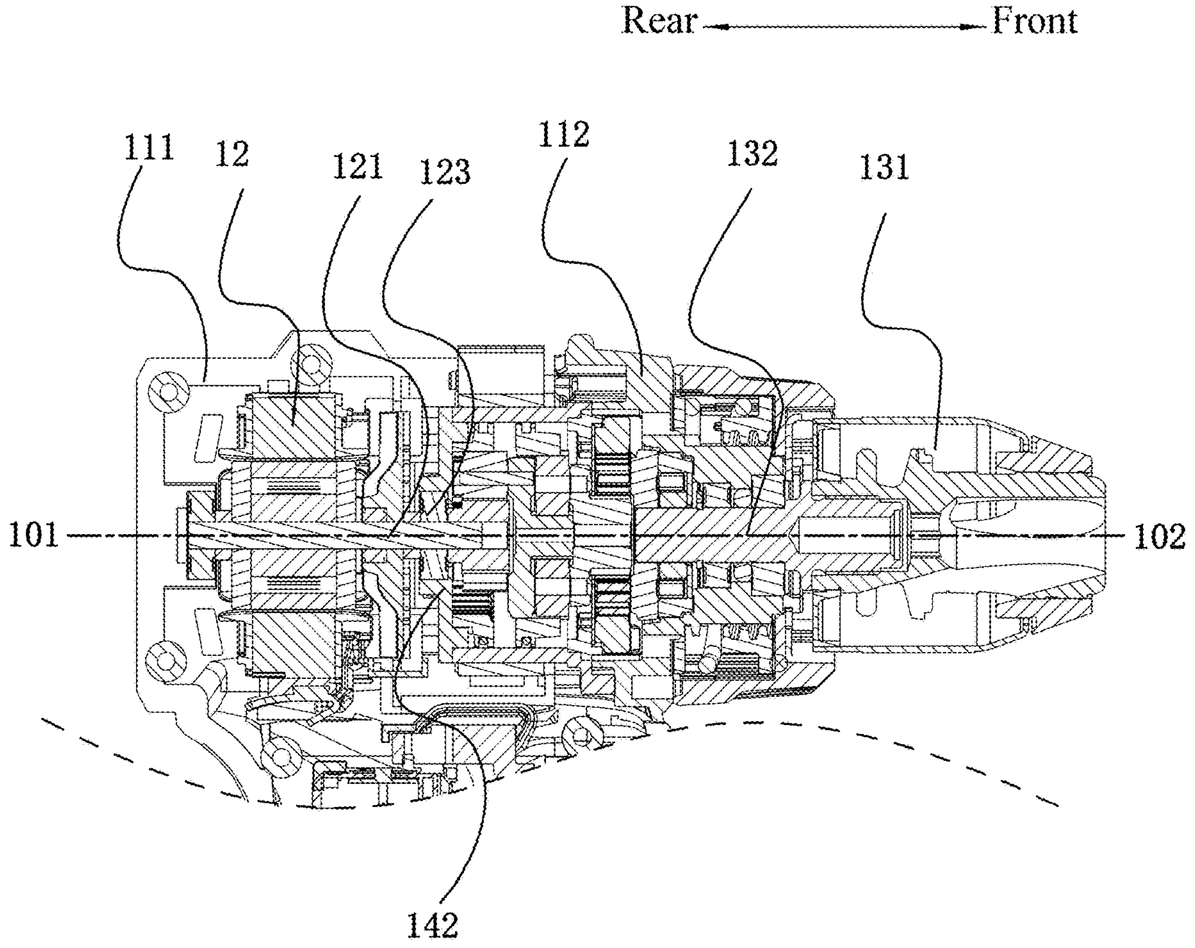
FIG. 2 is a partial sectional view of the first example of FIG. 1.
Figure 3:
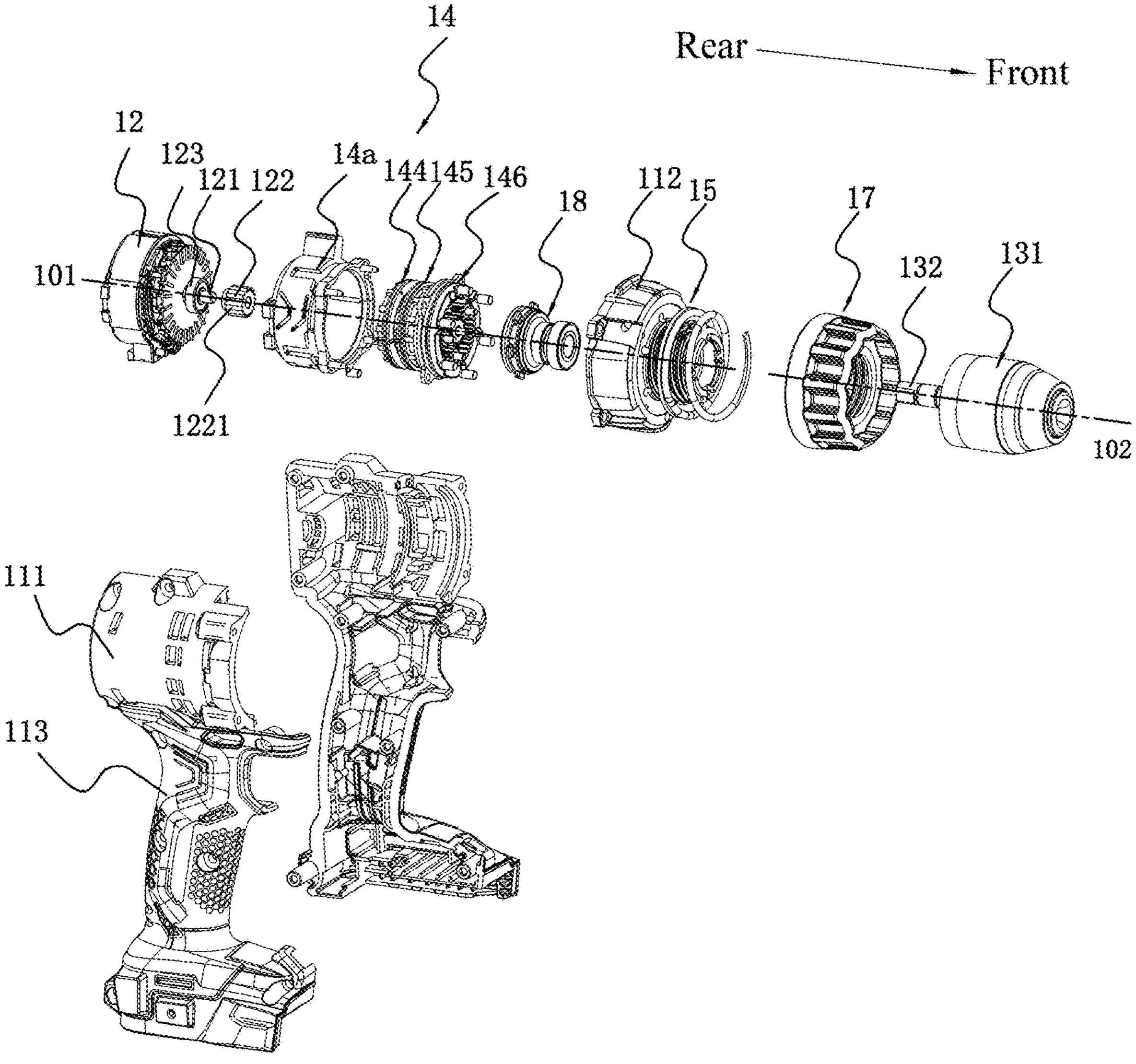
FIG. 3 is an exploded view of some structures of the first example of FIG. 1.

To clearly illustrate technical solutions of the present application, an upper side, a lower side, a front side, and a rear side shown in FIGS. 1 to 3 are also defined.

FIG. 1 shows a power tool in a first example of the present application. The power tool is an electric drill 100. It is to be understood that the power tool is a rotary tool, and in other alternative examples, different working accessories may be mounted to the rotary tool so that with these different working accessories, the power tool may be, for example, a handheld power tool such as an impact drill, an electric screwdriver, a grinding power tool (such as a sander, a finishing sander, and an angle grinder), and a reciprocating saw, an outdoor power tool such as a string trimmer, a mower, a hedge trimmer, and an electric saw, and other power tools that are not included above and that provide rotational output torque and include planet gear transmission.

FIGS. 1 to 3 show the electric drill 100 in the first example of the present application, and the electric drill 100 includes a power device 30. The power device 30 is configured to supply electrical energy to the electric drill 100. In this example, the power device 30 is a battery pack, and the battery pack cooperates with a corresponding power circuit to power corresponding components in the electric drill 100. It is to be understood by those skilled in the art that the power device 30 is not limited to the battery pack and may power the corresponding components in the machine through mains electricity or an alternating current power supply in cooperation with the corresponding rectifier, filter, and voltage regulation circuits.

The electric drill 100 includes a housing 11, an electric motor 12, an output mechanism 13, a transmission mechanism 14, and a clutch mechanism 15. The housing 11 includes a motor housing 111 for accommodating the electric motor 12 and an output housing 112 for accommodating at least part of the output mechanism 13. The output housing 112 is connected to the front end of the motor housing 111. The housing 11 is further formed with or connected to a grip 113 for a user to operate. The grip 113 and the motor housing 111 form a T-shaped, L-shaped, or linear structure which is convenient for the user to hold and operate. The power device 30 is connected to an end of the grip 113. The power device 30 is detachably connected to the grip 113.

The electric motor 12 includes a motor shaft 121 rotating about a first axis 101. The output mechanism 13 includes an output shaft 132 for connecting a working accessory and driving the working accessory to rotate. A clamping assembly 132 is disposed at the front end of the output shaft 131 and may clamp corresponding working accessories such as a screwdriver, a drill bit, and a wrench when different functions are implemented.

The output shaft 132 is configured to output power. The output shaft 132 rotates about an output axis. In this example, the output axis is a second axis 102. In this example, the first axis 101 coincides with the second axis 102. In other alternative examples, for the angle grinder and an angle drill, for example, the second axis 102 and the first axis 101 are arranged at a certain angle. In other alternative examples, the first axis 101 and the second axis 102 are parallel to each other but do not coincide with each other.

The transmission mechanism 14 is disposed between the electric motor 12 and the output shaft 132 and configured to transmit power between the electric motor 12 and the output shaft 132. The transmission mechanism 14 has multiple transmission gears in which different rotational speeds are output. To switch the transmission mechanism 14 between the multiple transmission gears, the electric drill 100 further includes a switching mechanism 16 configured to be operated to switch the transmission mechanism 14 between the transmission gears.

In this example, the clutch mechanism 15 is configured to, when torque transmitted from the output shaft 132 to the transmission mechanism 14 exceeds a set output threshold of the electric drill 100, prevent the output shaft 132 from being driven through the transmission mechanism 14. The electric drill 100 further includes a torque adjustment mechanism 17. The torque adjustment mechanism 17 is configured to set the output threshold of the electric drill 100. That is to say, the user sets a maximum value of output torque of the electric drill 100 through the torque adjustment mechanism 17. When the electric drill 100 is in operation, the electric drill 100 outputs torque to an operated workpiece. When a reverse force received from the operated workpiece exceeds the maximum value of output torque, the clutch mechanism 15 prevents the transmission mechanism 14 from continuing driving the output shaft 132 to output torque, thereby limiting the output torque of the electric drill 100 within a proper torque range.

Of course, it is to be understood that when the rotary power tool is the handheld power tool such as the electric screwdriver, the grinding power tool (such as the sander, the finishing sander, and the angle grinder), and the reciprocating saw and the outdoor power tool such as the string trimmer, the mower, the hedge trimmer, and the electric saw, the power tool just needs to adjust an output rotational speed and does not need to adjust the output torque, and thus the power tool may not be provided with the clutch mechanism, which does not affect the related structures of the transmission mechanism 14 that adjust the output rotational speed.

Figure 4:
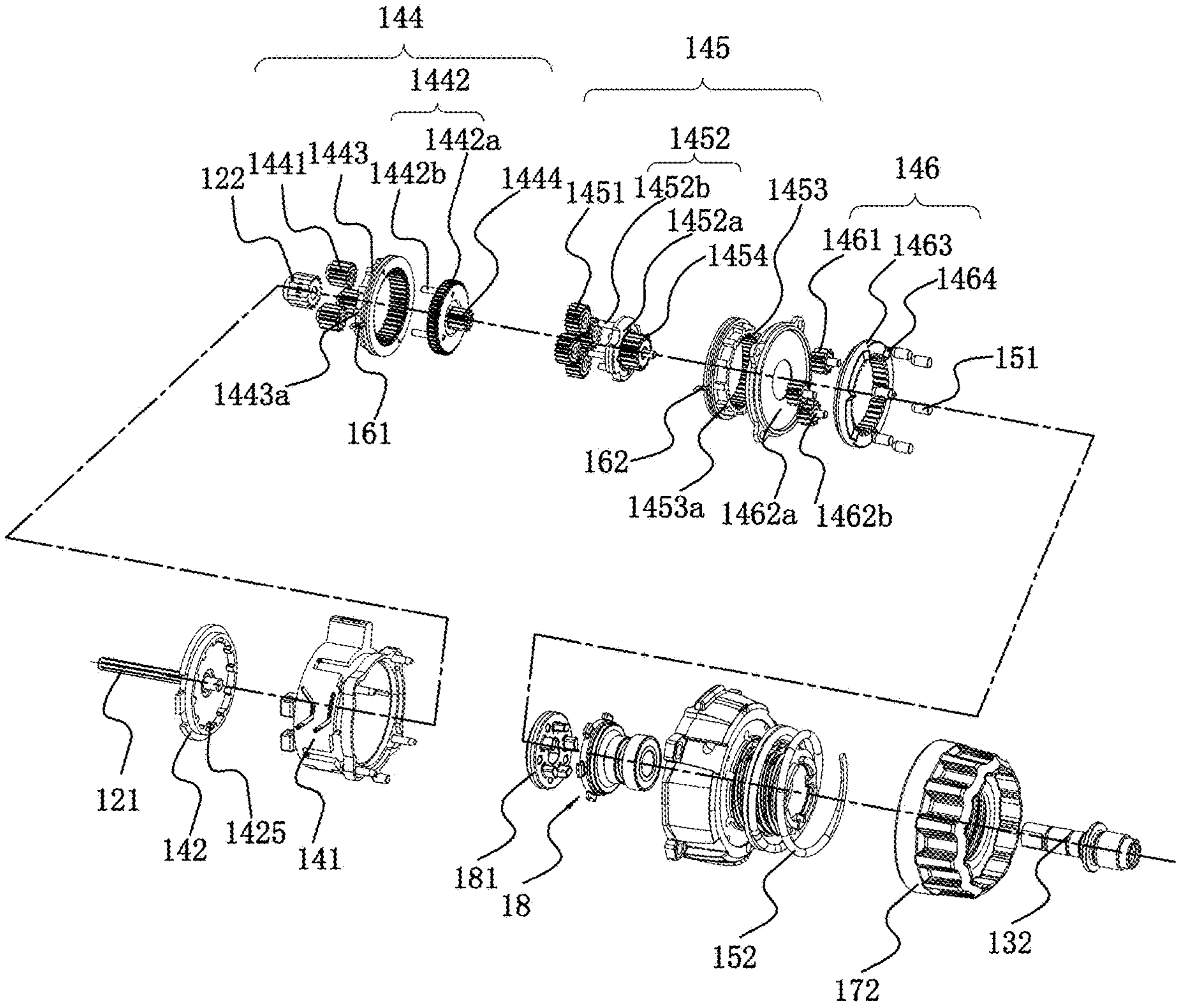
FIG. 4 is an exploded view of some structures in FIG. 3.

As shown in FIGS. 3 and 4, the transmission mechanism 14 includes a housing assembly 14*a*, a first-stage planetary gear set 144, a second-stage planetary gear set 145, and a third-stage planetary gear set 146. The first-stage planetary gear set 144, the second-stage planetary gear set 145, and the third-stage planetary gear set 146 are arranged in sequence from the electric motor 12 to the output mechanism 13. In this example, a planetary gear set in each stage includes one layer of planet gears, that is to say, the planet gears in the one layer are on the same plane in an axial direction. Gear ratios of planetary gear sets in three stages are adjusted so that three transmission gears of the transmission mechanism 14 are implemented. That is to say, the transmission mechanism 14 is a three-stage three-speed drive. The first-stage planetary gear set 144 is connected to the motor shaft 121, and the first-stage planetary gear set 144 includes a first drive state and a first variable state. In the first drive state, a gear ratio of the first-stage planetary gear set 144 is basically equal to 1. That is to say, the first-stage planetary gear set 144 transmits only speed and torque, and an output rotational speed and torque are basically equal to an input rotational speed and torque of the planetary gear set. In this example, the electric motor 12 has a first rotational speed. In the first drive state, the output rotational speed of the first-stage planetary gear set 144 is basically equal to the first rotational speed. In the first variable state, the first-stage planetary gear set outputs a second gear ratio which is not equal to 1. In this example, the gear ratio of the first-stage planetary gear set 144 is greater than 1. That is to say, the first-stage planetary gear set 144 performs reduction to increase torque. In this case, the output rotational speed is less than the input rotational speed of the planetary gear set, and the output torque is greater than the input torque of the planetary gear set. Any one of the second-stage planetary gear set 145 and the third-stage planetary gear set 146 is connected to the clutch mechanism 15.

Among the known and related rotary power tools, a product that can be adjusted between multiple speed gears generally includes two speed gears or three speed gears. A product with two speed gears generally uses planetary gear sets in three stages, and a first-stage planetary gear set and a stage of planetary gear set closest to the output shaft include only a variable state. The stage of planetary gear set closest to the output shaft is connected to the clutch mechanism, and a second-stage planetary gear set is switched between a drive state and a variable state to adjust the output rotational speed of the output shaft. A product with three speed gears generally uses planetary gear sets in four stages. A first-stage planetary gear set and a stage of planetary gear set closest to the output shaft include only a variable state. The stage of planetary gear set closest to the output shaft is connected to the clutch mechanism. Planetary gear sets in the remaining two stages implement the switching between the three speed gears.

In this example, the first-stage planetary gear set 144 switchable between the drive state and the variable state is added, one of the second-stage planetary gear set and the third-stage planetary gear set is connected to the clutch mechanism 15, and the other of the second-stage planetary gear set and the third-stage planetary gear set also includes the variable state and the drive state, so as to implement three speed gears of the planetary gear sets in three stages. The length of the transmission mechanism with three adjustable speed gears is made the same as that of a transmission mechanism with only two adjustable speed gears. In this manner, the transmission mechanism 14 is not only applicable to a wide range of working conditions but also compact in structure and small in axial dimension, thereby implementing product miniaturization. In this example, the third-stage planetary gear set is connected to the clutch mechanism so that a small radial dimension of the product can be further ensured. In another aspect, such a layout manner of a transmission system is more conducive to stable output of the transmission system and is more conducive to the working stability of cooperation between the clutch mechanism and the torque adjustment mechanism than the connection of the first-stage planetary gear set to the clutch mechanism.

Figure 5:
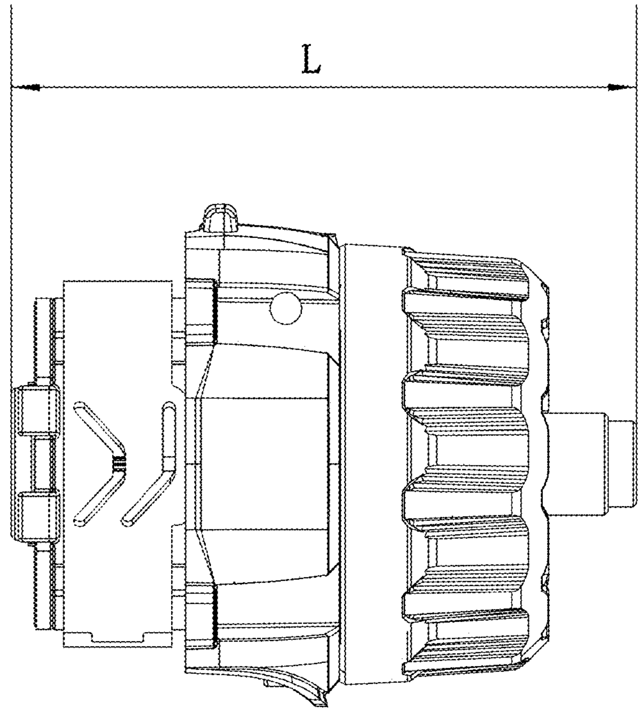
FIG. 5 is a plan view of partial structures of a transmission mechanism, an output shaft, a clutch mechanism, a torque adjustment mechanism, a shaft lock mechanism, and a switching mechanism in FIG. 1.

As shown in FIG. 5, the distance L between a rear end face of the housing assembly 14*a* and the front end of the output shaft 132 is less than or equal to 70 mm. In some examples, the distance L between the rear end face of the housing assembly 14*a* and the front end of the output shaft 132 is less than or equal to 65 mm. In some examples, the distance L between the rear end face of the housing assembly 14*a* and the front end of the output shaft 132 is less than or equal to 60 mm. To ensure that the output torque of the output shaft 132 reaches a standard, considering the strength and lifetime of the product, the distance L between the rear end face of the housing assembly 14*a* and the front end of the output shaft 132 is greater than or equal to 45 mm.

It is to be understood that in other alternative examples, the power tool may be a rotary impact power tool, and an impact mechanism for providing an impact force is disposed between the transmission mechanism and the output shaft. In this case, the distance between the rear end face of the housing assembly 14*a* and the front end of the output shaft 132 increases due to the impact mechanism. The distance L between the rear end face of the housing assembly 14*a* and the front end of the output shaft 132 is less than or equal to 85 mm.

In this example, the third-stage planetary gear set 146 is connected to the clutch mechanism 15 and includes a third variable state in which a fifth gear ratio is output, where the fifth gear ratio is not equal to 1. In this example, the fifth gear ratio is greater than 1. It is to be understood that the first-stage planetary gear set 144 is a planetary gear set closest to the electric motor 12, and the third-stage planetary gear set 146 is a planetary gear set closest to the output shaft 132. An intermediate planetary gear set is disposed between the first-stage planetary gear set 144 and the third-stage planetary gear set 146 for a driving connection, and a corresponding number of intermediate planetary gear sets may be provided according to a different number of transmission gears required by the power tool. In this example, three transmission gears are required by the power tool. Therefore, the first-stage planetary gear set 144 and the third-stage planetary gear set 146 are connected by the second-stage planetary gear set 145. The second-stage planetary gear set 145 includes a second drive state and a second variable state. In the second drive state, the second-stage planetary gear set outputs a third gear ratio which is equal to 1. In the second variable state, the second-stage planetary gear set outputs a fourth gear ratio which is not equal to 1. In this example, the fourth gear ratio is greater than 1. In other alternative examples, at most two of the second gear ratio, the fourth gear ratio, and the fifth gear ratio may be less than 1.

The structures of the first-stage planetary gear set 144, the second-stage planetary gear set 145, and the third-stage planetary gear set 146 are separately described in detail below.

As shown in FIGS. 2 to 4, the first-stage planetary gear set 144 includes first planet gears 1441, a first planet carrier 1442 for mounting the first planet gears 1441, and a first inner ring gear 1443 meshing with the first planet gears 1441. The motor shaft 121 is formed with or connected to a first sun gear 122 rotating at a first rotational speed. In this example, the first sun gear 122 and the motor shaft 121 rotate coaxially. Specifically, the first sun gear 122 rotates about the first axis 101. The first sun gear 122 is connected to the motor shaft 121.

The first sun gear 122 drives the first planet gears 1441. The first planet gears 1441 are configured to mesh with the first sun gear 122. Multiple first planet gears 1441 are provided, and the multiple first planet gears 1441 are configured to mesh with the first sun gear 122. In this example, at least three first planet gears 1441 are circumferentially disposed around the first axis 101. The first sun gear 122 is formed with a meshing tooth portion 1221 for transmitting power to the first planet gears 1441. Since the second gear ratio is greater than 1, the number of meshing teeth of the first-stage planetary gear set 144 is greater than the number of teeth of the meshing tooth portion 1221 of the sun gear. The first inner ring gear 1443 meshes with the periphery of the multiple first planet gears 1441. The first planet carrier 1442 includes a first drive disc 1442*a*, a first support frame 1442*b*, and a first output portion. The first support frame 1442*b* and the first output portion are formed on two sides of the first drive disc 1442*a* separately, and the first output portion rotates synchronously with the first drive disc 1442*a*. The first support frame 1442*b* is inserted into the first planet gears 1441 and rotatably connected to the first planet gears 1441 so that the first planet gears 1441 can drive the first planet carrier 1442 to rotate about the first axis 101. Meshing teeth are formed on the circumferential side of the first output portion, and the first output portion is configured to mesh with the second-stage planetary gear set 145 so that the first-stage planetary gear set 144 and the second-stage planetary gear set 145 are drivingly connected. In this example, the first output portion is a second sun gear 1444 in the second-stage planetary gear set 145. When the first-stage planetary gear set 144 is in the first variable state, the first inner ring gear 1443 is fixed. In this example, the first inner ring gear 1443 cannot rotate about the first axis 101, and the first-stage planetary gear set 144 implements a reduction function. When the first-stage planetary gear set 144 is in the first drive state, the first inner ring gear 1443 is released and allowed to be driven by the first sun gear 122 to rotate. In this example, the first inner ring gear 1443 and the first planet carrier 1442 rotate synchronously about the first axis 101, and the first-stage planetary gear set 144 has no reduction effect.

Meshing teeth are formed on the outer circumferential side of the first drive disc 1442*a*. When the first-stage planetary gear set 144 is in the first drive state, the first inner ring gear 1443 meshes and rotates synchronously with the meshing teeth of the first drive disc 1442*a*. In this example, since the first output portion of the first planet carrier 1442 is the second sun gear 1444 in the second-stage planetary gear set, when the first inner ring gear 1443 meshes and rotates synchronously with the meshing teeth of the first drive disc 1442*a*, it is equivalent to transmitting a rotational speed and torque of the first sun gear 122 to the second sun gear 1444.

A structure for fixing and releasing the first inner ring gear 1443 is described in detail below.

As shown in FIGS. 3 to 6 and FIGS. 9 to 11, the housing assembly 14*a* includes a first housing 141, a first cover 142 mounted at an end of the first housing 141, and first fasteners 143 for connecting the first housing 141 to the first cover 142. The first housing 141 extends along the first axis 101 and forms a cylindrical accommodation space. The first-stage planetary gear set 144 is at least partially accommodated in the first housing 141. The first cover 142 extends along a direction perpendicular to the first axis 101 and is mounted at an end of the first housing 141 facing the electric motor 12. A first bearing 123 configured to support the motor shaft 121 is disposed on the motor shaft 121. In this example, the first bearing 123 is a front bearing of the electric motor. The first cover 142 is provided with an accommodation portion 1422, and the first bearing 123 is accommodated in the accommodation portion 1422. The motor shaft 121 extends out of the first cover 142 into the first housing 141 through the accommodation portion 1422 so that the first sun gear 122 disposed at the front end of the motor shaft 121 extends into the first housing 141.

The first cover 142 is formed with or connected to a flange portion 1423 extending into the first housing 141, and the flange portion 1423 is formed with or fixed to a locking portion 1425 configured to prevent the first inner ring gear 1443 from rotating. When the first-stage planetary gear set 144 is in the first variable state, the first inner ring gear 1443 is fixed by the locking portion 1425. When the first-stage planetary gear set 144 is in the first drive state, the first inner ring gear 1443 is released by the locking portion 1425. The locking portion 1425 for locking the first inner ring gear 1443 is disposed on the first cover 142, which does not affect or hinder other components of the transmission mechanism 14. Meanwhile, a locking structure is added to the first cover 142, which has good economy, minimizes modifications to other molds or components, has a significant advantage in cost, and does not increase an axial length.

In this example, the locking portion 1425 includes multiple first locking teeth spaced along a circumferential direction of the flange portion 1423, and the first locking teeth extend along an axial direction of the first housing 141, that is, extend along a direction of the first axis 101. The first inner ring gear 1443 includes multiple first mating teeth 1443*a* spaced along a circumferential direction of the first inner ring gear 1443, and the first mating teeth 1443*a* extend along an axial direction of the first inner ring gear 1443, that is, extend along the direction of the first axis 101. The first locking teeth and the first mating teeth 1443*a* are staggered in a circumferential direction of the first axis 101. When the first mating teeth 1443*a* are connected to the first locking teeth, the first locking teeth prevent the rotation of the first mating teeth 1443*a* relative to the first locking teeth. Specifically, when the first locking teeth are engaged into contact with the first mating teeth 1443*a*, the first inner ring gear 1443 is fixed to the first cover 142.

The first housing 141 and the first cover 142 are connected by the first fasteners 143. Specifically, the first housing 141 is provided with second connection portions 1411 along the direction perpendicular to the first axis 101. The first cover 142 is correspondingly provided with first connection portions 1421 along the direction perpendicular to the first axis 101. When the first housing 141 and the first cover 142 are assembled, a second connection portion 1411 and a first connection portion 1421 are interconnected. The second connection portion 1411 and the first connection portion 1421 are connected by a first fastener 143. Then, the first fastener 143 prevents, along the direction perpendicular to the first axis 101, a relative displacement between the first housing 141 and the first cover 142. In this example, the first fastener 143 mates with the second connection portion 1411 and the first connection portion 1421 in the manner of a pin and a hole. The first fastener 143 is interference-inserted into the second connection portion 1411 and the first connection portion 1421. In other alternative examples, the first fastener 143 may be an externally threaded component or another resilient snap structure. To prevent the relative swinging of the first cover 142 relative to the first housing 141, at least two structures of the first fastener 143, the second connection portion 1411, and the first connection portion 1421 are symmetrically disposed.

As shown in FIGS. 2 to 4, in this example, the second-stage planetary gear set 145 includes second planet gears 1451, a second planet carrier 1452 for mounting the second planet gears 1451, and a second inner ring gear 1453 meshing with the second planet gears 1451. The first planet carrier 1442 is formed with the second sun gear 1444, and the second sun gear 1444 drives the second planet gears 1451. In this example, the second sun gear 1444 and the motor shaft 121 rotate coaxially. Specifically, the second sun gear 1444 rotates about the first axis 101.

The second planet gears 1451 are configured to mesh with the second sun gear 1444. Multiple second planet gears 1451 are provided, and the multiple second planet gears 1451 are configured to mesh with the second sun gear 1444. In this example, four second planet gears 1451 are circumferentially disposed around the first axis 101. A cooperation relationship between the second planet gears 1451, the second planet carrier 1452, and the second inner ring gear 1453 is the same as the corresponding cooperation relationship in the first-stage planetary gear set 144 and is well-known to those skilled in the art. The details are not repeated here.

The second planet carrier 1452 includes a second drive disc 1452*a*, a second support frame 1452*b*, and a second output portion. The second support frame 1452*b* and the second output portion are formed on two sides of the second drive disc 1452*a* separately, and the second output portion rotates synchronously with the second drive disc 1452*a*. The second support frame 1452*b* is inserted into the second planet gears 1451 and rotatably connected to the second planet gears 1451 so that the second planet gears 1451 can drive the second planet carrier 1452 to rotate about the first axis 101 during operation. Meshing teeth are formed on the circumferential side of the second output portion, and the second output portion is configured to mesh with the third-stage planetary gear set 146 so that the second planetary gear set 145 and the third-stage planetary gear set 146 are drivingly connected. In this example, the second output portion is a third sun gear 1454 in the third-stage planetary gear set 146. When the second-stage planetary gear set 145 is in the second variable state, the second inner ring gear 1453 is fixed. In this example, the second inner ring gear 1453 cannot rotate about the first axis 101, and the second-stage planetary gear set 145 implements a speed change function. In this example, when the second-stage planetary gear set 145 is in the second variable state, the fourth gear ratio of the second-stage planetary gear set 145 is greater than 1, and therefore, the second variable state is reduction transmission. When the second-stage planetary gear set 145 is in the second drive state, the second inner ring gear 1453 is released and allowed to be driven by the second sun gear 1444 to rotate. Specifically, the second inner ring gear 1453 and the second planet carrier 1452 rotate synchronously about the first axis 101, and the second-stage planetary gear set 145 has no reduction effect.

A structure for fixing and releasing the second inner ring gear 1453 is described in detail below.

As shown in FIGS. 4, 6, and 9 to 11, the second-stage planetary gear set 145 is at least partially accommodated in the first housing 141. An end of the first housing 141 facing the output shaft 132 is formed with or connected to third connection portions 1413, and the first housing 141 and the output housing 112 are detachably connected by the third connection portions 1413. The first housing 141 and the output housing 112 are interconnected to form a communicating accommodation cavity. A second locking portion 1412 for locking the second inner ring gear 1453 is formed in the first housing 141. The second inner ring gear 1453 is provided with second mating teeth 1453*a*. When the second-stage planetary gear set 145 is in the second variable state, the second inner ring gear 1453 is fixed by the second locking portion 1412. When the second-stage planetary gear set 145 is in the second drive state, the second inner ring gear 1453 is released by the second locking portion 1412.

In this example, a locking and release structure of the second inner ring gear 1453 and the second locking portion 1412 is the same as a locking and release structure of the first inner ring gear 1443 and the locking portion 1425. Locking teeth staggered along the circumferential direction of the first axis 101 are used, which are well-known to those skilled in the art. The details are not repeated here. To facilitate the manufacturing of a mold of the first housing 141, the second locking portion 1412 is fixed into the first housing 141 in the manner of an embedded component.

As shown in FIG. 1, the switching mechanism 16 includes an operating member 163 for the user to operate.

As shown in FIGS. 4, 6, and 9 to 11, the switching mechanism 16 includes shift forks. The shift forks drive the first inner ring gear 1443 and/or the second inner ring gear to reciprocate along the first axis 101. Specifically, a first shift fork 161 for driving the first inner ring gear 1443 is included. The first shift fork 161 is connected to the first inner ring gear 1443. When the first-stage planetary gear set 144 is required to be in the first variable state, the first shift fork 161 is operated to drive the first inner ring gear 1443 to move along the first axis 101 toward the first cover 142 until the first locking teeth are engaged into contact with the first mating teeth 1443*a*, and the rotation of the first inner ring gear 1443 about the first axis 101 is prevented. When the first-stage planetary gear set 144 is required to be in the first drive state, the first shift fork 161 is operated to drive the first inner ring gear 1443 to move along the first axis 101 away from the first cover 142 until the first locking teeth are disengaged from the first mating teeth 1443*a*.

In this example, a second shift fork 162 for driving the second inner ring gear 1453 is further included and connected to the second inner ring gear 1453. When the second-stage planetary gear set 145 is required to be in the second variable state, the second shift fork 162 is operated to drive the second inner ring gear 1453 to move along the first axis 101 toward the output housing 112 until the second inner ring gear 1453 is locked and connected to the second locking portion 1412, and the rotation of the second inner ring gear 1453 about the first axis 101 is prevented. When the second-stage planetary gear set 145 is required to be in the second drive state, the second shift fork 162 is operated to drive the second inner ring gear 1443 to move along the first axis 101 toward the first planet carrier 1442 until the second inner ring gear 1453 is disconnected from the second locking portion 1412. The second inner ring gear 1453 meshes and rotates synchronously with meshing teeth of the second planet carrier 1452. It is equivalent to the rotation of the second inner ring gear 1453 in synchronization with the second sun gear 1444.

As shown in FIGS. 2 to 4, 12, and 13, in this example, the third-stage planetary gear set 146 includes third planet gears 1461, a third planet carrier, and a third inner ring gear 1463 meshing with the third planet gears 1461. The second planet carrier 1452 is formed with the third sun gear 1454, and the third sun gear 1454 drives the third planet gears 1461. In this example, the third sun gear 1454 and the motor shaft 121 rotate coaxially. That is to say, the third sun gear 1454 rotates about the first axis 101.

The third planet gears 1461 are configured to mesh with the third sun gear 1454. Multiple third planet gears 1461 are provided, and the multiple third planet gears 1461 are configured to mesh with the third sun gear 1454. The third planet carrier includes a retaining disc 1462*a*, a third support frame 1462*b*, and a third drive disc. The third support frame 1462*b* is disposed on one side of the retaining disc 1462*a*, and the second-stage planetary gear set 145 is disposed on the other side of the retaining disc 1462*a*. The third sun gear 1454 passes through the retaining disc 1462*a* and meshes with the third planet gears 1461. The third support frame 1462*b* is inserted into the third planet gears 1461 and rotatably connected to the third planet gears 1461. The third support frame 1462*b* is inserted into the third drive disc. In this example, the third drive disc is a shaft lock frame 181 in a shaft lock mechanism 18. Meanwhile, the shaft lock mechanism 18 is connected to the output shaft 132. In this example, the third support frame 1462*b* drives the shaft lock frame 181 to drive the shaft lock mechanism 18 to rotate. It is to be understood that since the third planet gears 1461 drive the shaft lock mechanism 18 to rotate, the shaft lock frame connected to the third support frame 1462*b* in the shaft lock mechanism 18 may be understood as the third drive disc. Of course, in other alternative examples, the third drive disc and the shaft lock frame may be separately disposed, and then the third drive disc and the shaft lock frame are connected to each other. The output shaft 132 includes a flat portion mating with the shaft lock mechanism 18, and part of the output shaft 132 is placed into the shaft lock mechanism 18 so that the output shaft 132 and the third support frame 1462*b* rotate synchronously.

The third-stage planetary gear set 146 is partially accommodated in the output housing 112. The clutch mechanism 15 mates with the third inner ring gear 1463. The rotation of the third inner ring gear 1463 about the first axis 101 is prevented by the clutch mechanism 15 and the torque adjustment mechanism 17. When the reverse force received by the output shaft 132 from the operated workpiece does not exceed the maximum value of output torque, the rotation of the third inner ring gear 1463 about the first axis 101 is prevented, and the third-stage planetary gear set 146 implements the speed change function and is in the third variable state. In this example, when the third-stage planetary gear set 146 is in the third variable state, the fifth gear ratio of the third-stage planetary gear set is greater than 1, and therefore, the reduction effect is achieved in the third variable state. When the reverse force received by the output shaft 132 from the operated workpiece exceeds the maximum value of output torque, the rotation of the third inner ring gear 1463 about the first axis 101 is released, the third inner ring gear 1463 rotates with the third planet gears 1461 about the first axis 101, the third support frame 1462*b* stops rotating and cannot output power to the output shaft 132, and the output shaft 132 is no longer rotated.

Figure 6:
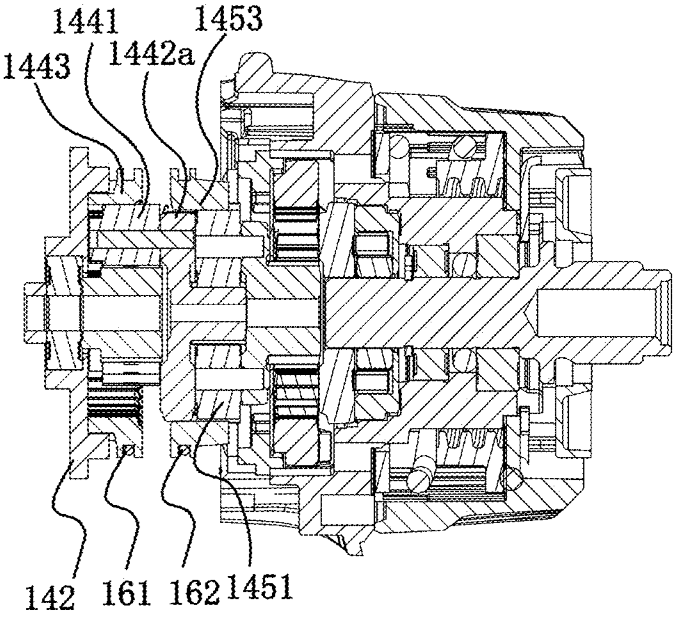
FIG. 6 is a sectional view when the transmission mechanism in FIG. 5 is in a first transmission gear, with a first housing removed.
Figure 7:
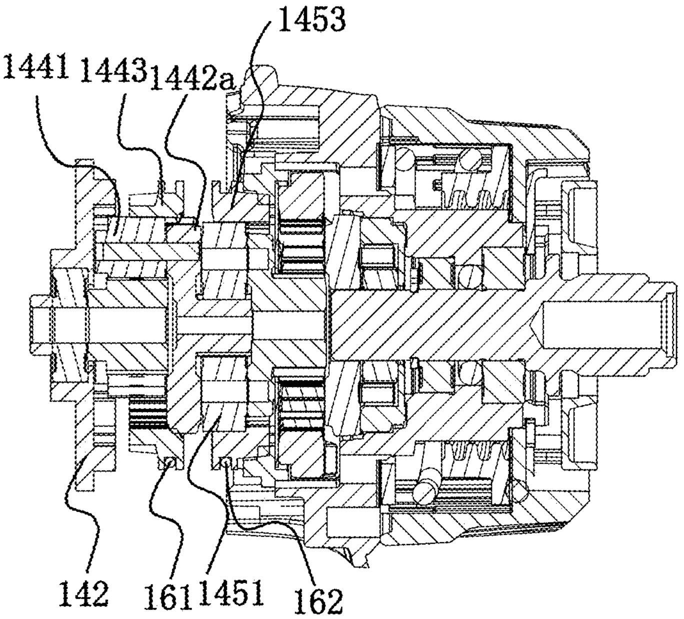
FIG. 7 is a sectional view when the transmission mechanism in FIG. 5 is in a second transmission gear, with a first housing removed.
Figure 8:
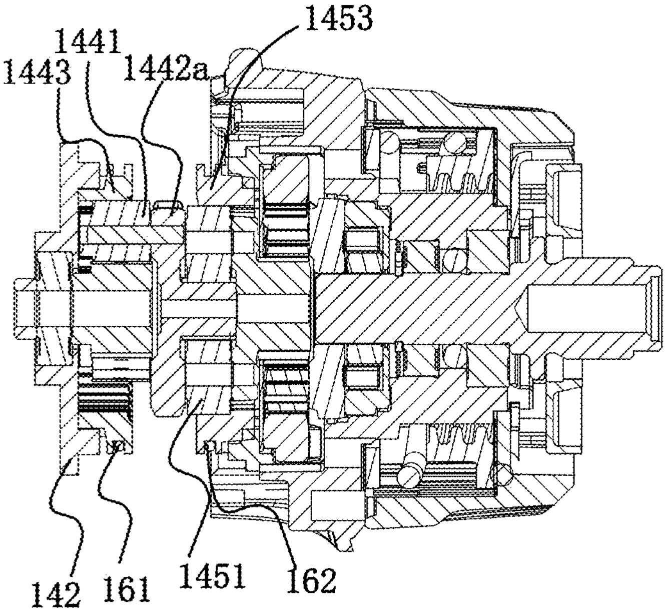
FIG. 8 is a sectional view when the transmission mechanism in FIG. 5 is in a third transmission gear, with a first housing removed.
Figure 9:
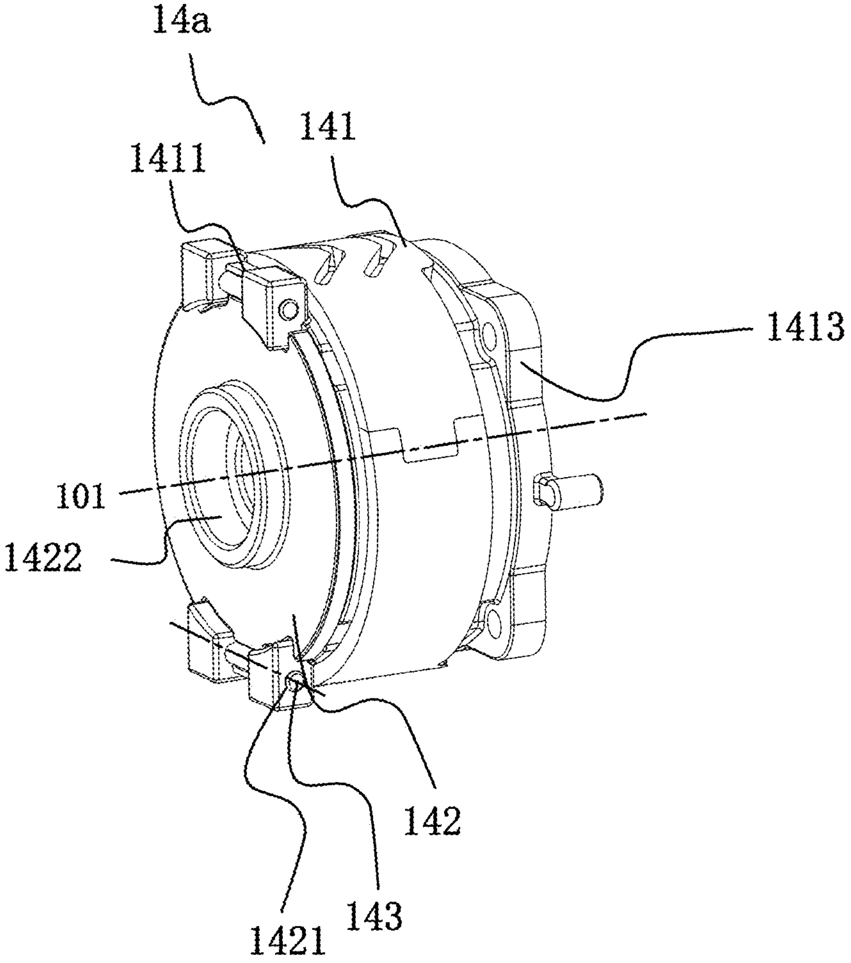
FIG. 9 is a structural view of a housing assembly and a second inner ring gear of FIG. 5 when the transmission mechanism is in a first transmission gear.
Figure 10:
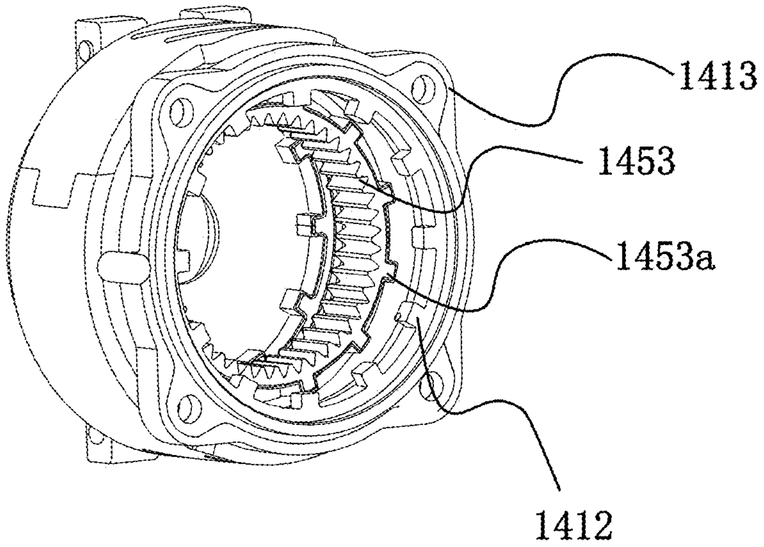
FIG. 10 is a view of FIG. 9 from another perspective.
Figure 11:
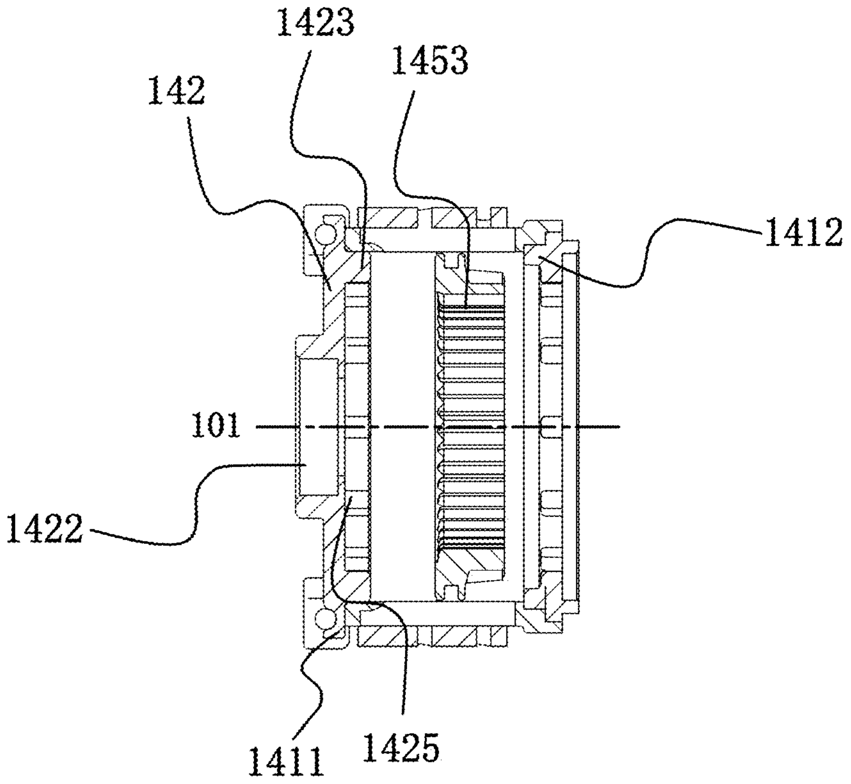
FIG. 11 is a sectional view of FIG. 9.
Figure 12:
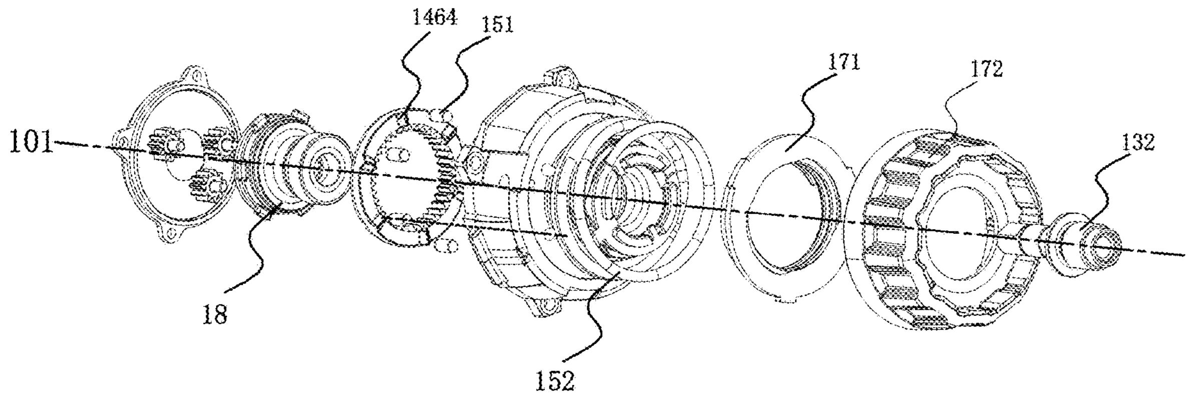
FIG. 12 is an exploded view of some structures in FIG. 3.
Figure 13:
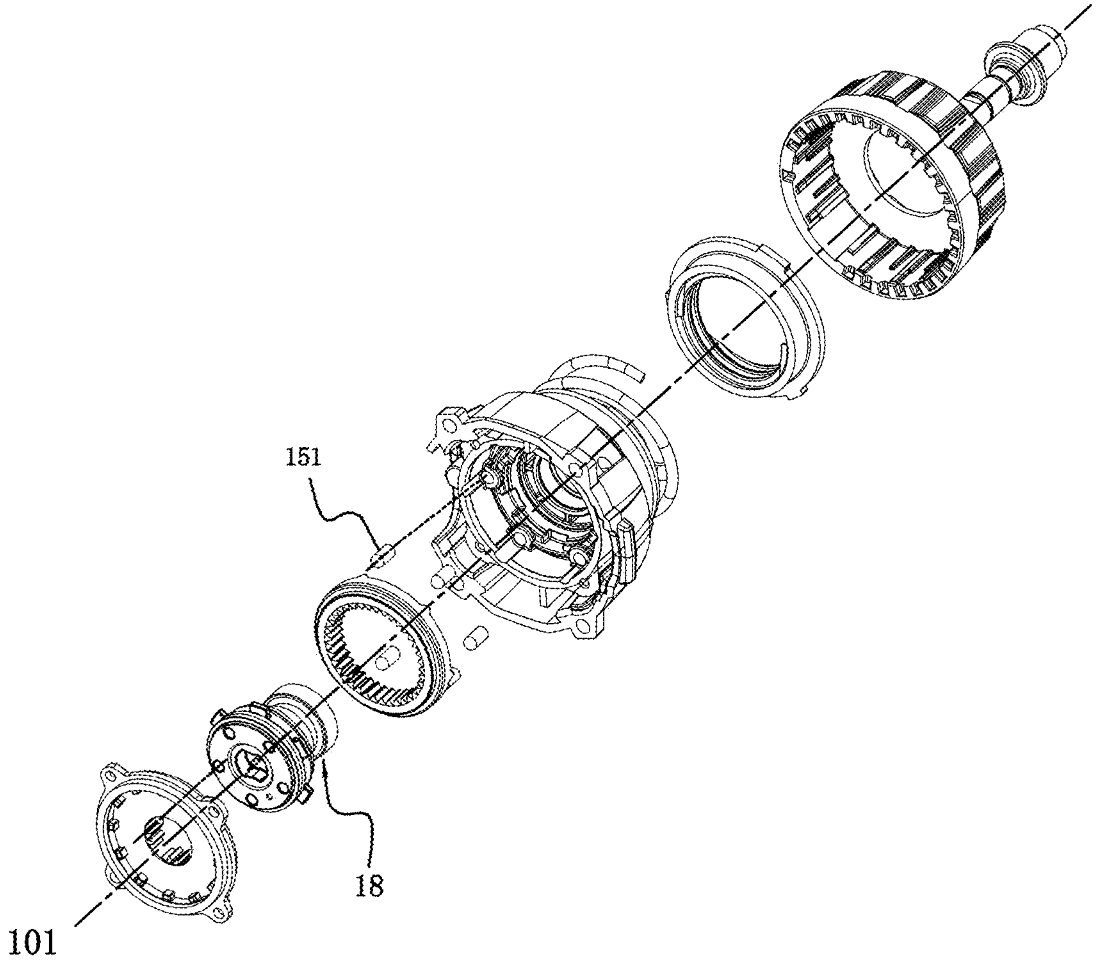
FIG. 13 is a view of FIG. 12 from another perspective.

As shown in FIG. 6, when the transmission mechanism 14 is in a first transmission gear, the first-stage planetary gear set 144 is in the first variable state, the third-stage planetary gear set 146 is in the third variable state, and the second-stage planetary gear set 145 is in the second drive state. As shown in FIG. 7, when the transmission mechanism 14 is in a second transmission gear, the second-stage planetary gear set 145 is in the second variable state, the third-stage planetary gear set 146 is in the third variable state, and the first-stage planetary gear set 144 is in the first drive state. As shown in FIG. 8, when the transmission mechanism 14 is in a third transmission gear, the first-stage planetary gear set 144 is in the first variable state, the second-stage planetary gear set 145 is in the second variable state, and the third-stage planetary gear set 146 is in the third variable state. In this example, the second gear ratio is less than the fourth gear ratio; therefore, a first output rotational speed of the output shaft in the first transmission gear is greater than a second output rotational speed of the output shaft in the second transmission gear. The second output rotational speed of the output shaft in the second transmission gear is greater than a third output rotational speed of the output shaft in the third transmission gear. The gear ratio is determined by the ratio of the tip diameter of a meshing tooth portion of a sun gear to the tip diameter of the planetary gear set, that is, the ratio of the number of meshing teeth of the planetary gear set to the number of teeth of the meshing tooth portion of the sun gear. Therefore, in other alternative examples, the second gear ratio is greater than the fourth gear ratio.

In this example, when the transmission mechanism is in the first transmission gear, the first output rotational speed of the output shaft is greater than 2000 rpm and less than 4200 rpm. When the transmission mechanism is in the second transmission gear, the second output rotational speed of the output shaft is greater than 1500 rpm and less than 2500 rpm. When the transmission mechanism is in the third transmission gear, the third output rotational speed of the output shaft is greater than 400 rpm and less than 1000 rpm.

As shown in FIGS. 3, 4, 12, and 13, the clutch mechanism 15 includes lock pins 151 connected to the third inner ring gear 1463 and configured to prevent the rotation of the third inner ring gear 1463, and the third inner ring gear 1463 is provided with limiting teeth 1464 abutting against the lock pins 151. A biasing element 152 is configured to bias the lock pins 151 so that the lock pins 151 apply to the third inner ring gear 1463 a locking force for preventing the rotation of the third inner ring gear 1463. The torque adjustment mechanism 17 includes a torque adjustment ring 171 and a torque cup 172 disposed outside the output housing 112. The torque cup 172 is connected to the torque adjustment ring 171 and used for the user to operate. The torque adjustment ring 171 is connected to the biasing element 152. The user rotates the torque cup 172 to drive the torque adjustment ring 171 to adjust an amount of compression of the biasing element 152, so as to adjust a biasing force applied by the biasing element 152 to the lock pins 151. The lock pins 151 are subjected to not only the rotational torque of the limiting teeth 1464 but also the biasing force of the biasing element 152.

If the pressure generated by the rotational torque of the limiting teeth 1464 received by the lock pins 151 cannot exceed the biasing force of the biasing element 152, the lock pins 151 drive the third inner ring gear 1463 to stop rotating. The third support frame **1462*b* can output power to the output shaft 132. If the pressure of the limiting teeth 1464 received by the lock pins 151 can exceed the biasing force of the biasing element 152, the lock pins 151 move in the axial direction beyond the limiting teeth 1464. The third inner ring gear 1463 rotates with the third planet gears 1461 about the first axis 101, the third support frame 1462*b* stops rotating and cannot output power to the output shaft 132, and the output shaft 132** is no longer rotated.

As shown in FIGS. 14 to 34, a power tool is disclosed in this example. Components of this example the same as or corresponding to those of example one use the corresponding reference numerals or names in example one. For simplicity, only differences between example one and example two are described. The power tool in this example is an electric drill 200, and the differences from example one lie in a transmission mechanism and associated structures.

Figure 14:
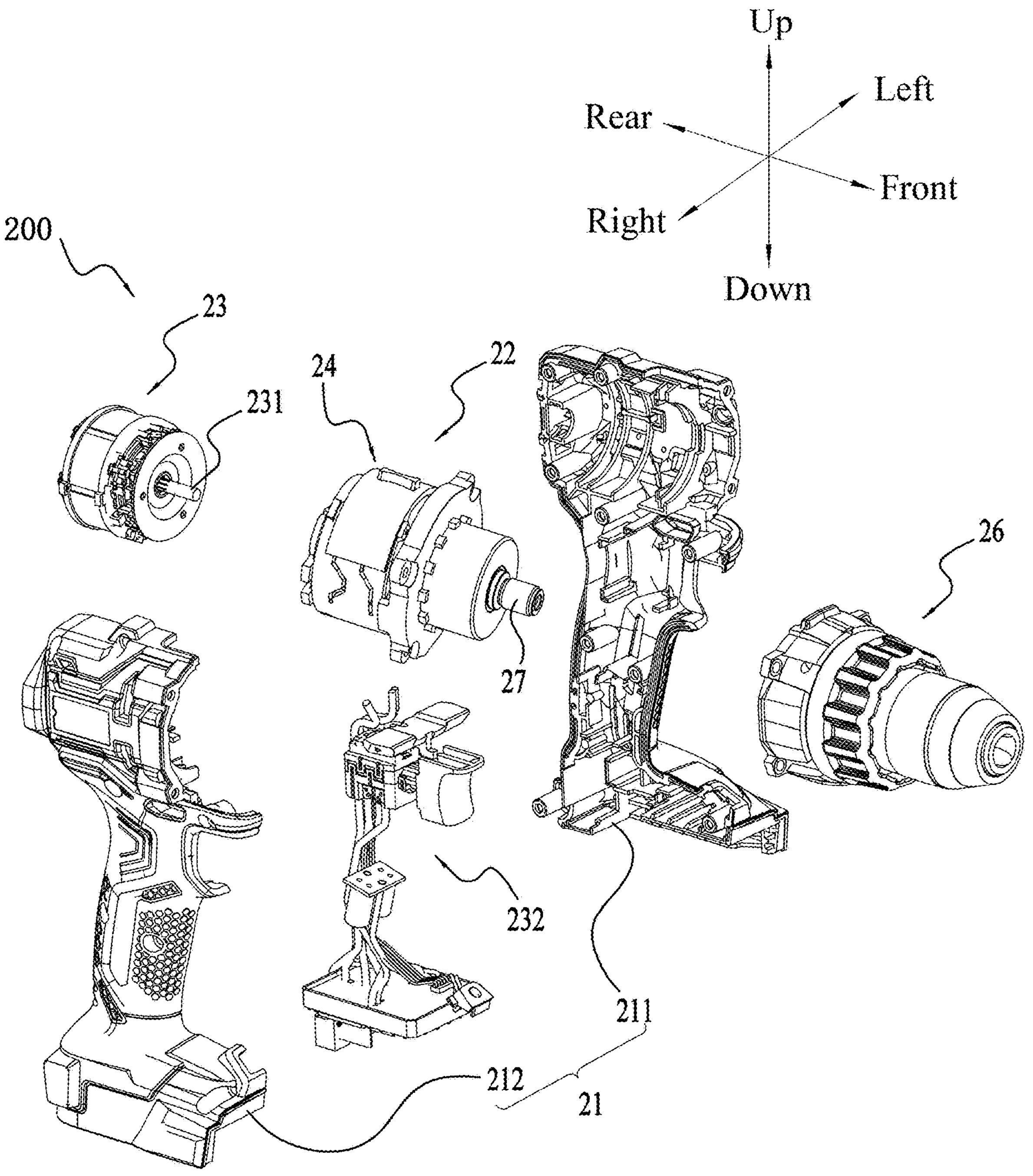
FIG. 14 is an exploded view of a second example of the present application.

As shown in FIG. 14, the electric drill 200 includes a housing 21, an electric motor 23, an output mechanism 26, a transmission mechanism 22, and an output shaft 27. The housing 21 includes a left housing 211 and a right housing 212 that together provide an accommodation space, and the transmission mechanism 22, the electric motor 23, and an electronic component 232 may be accommodated in the accommodation space. The electric motor 23 is formed with or connected to a motor shaft 231. The motor shaft 231 transmits output torque of the electric motor to the transmission mechanism 22. The transmission mechanism 22 implements power transmission between the motor shaft 231 and the output shaft 27 to implement the final torque output of the electric drill 200.

Figure 15:
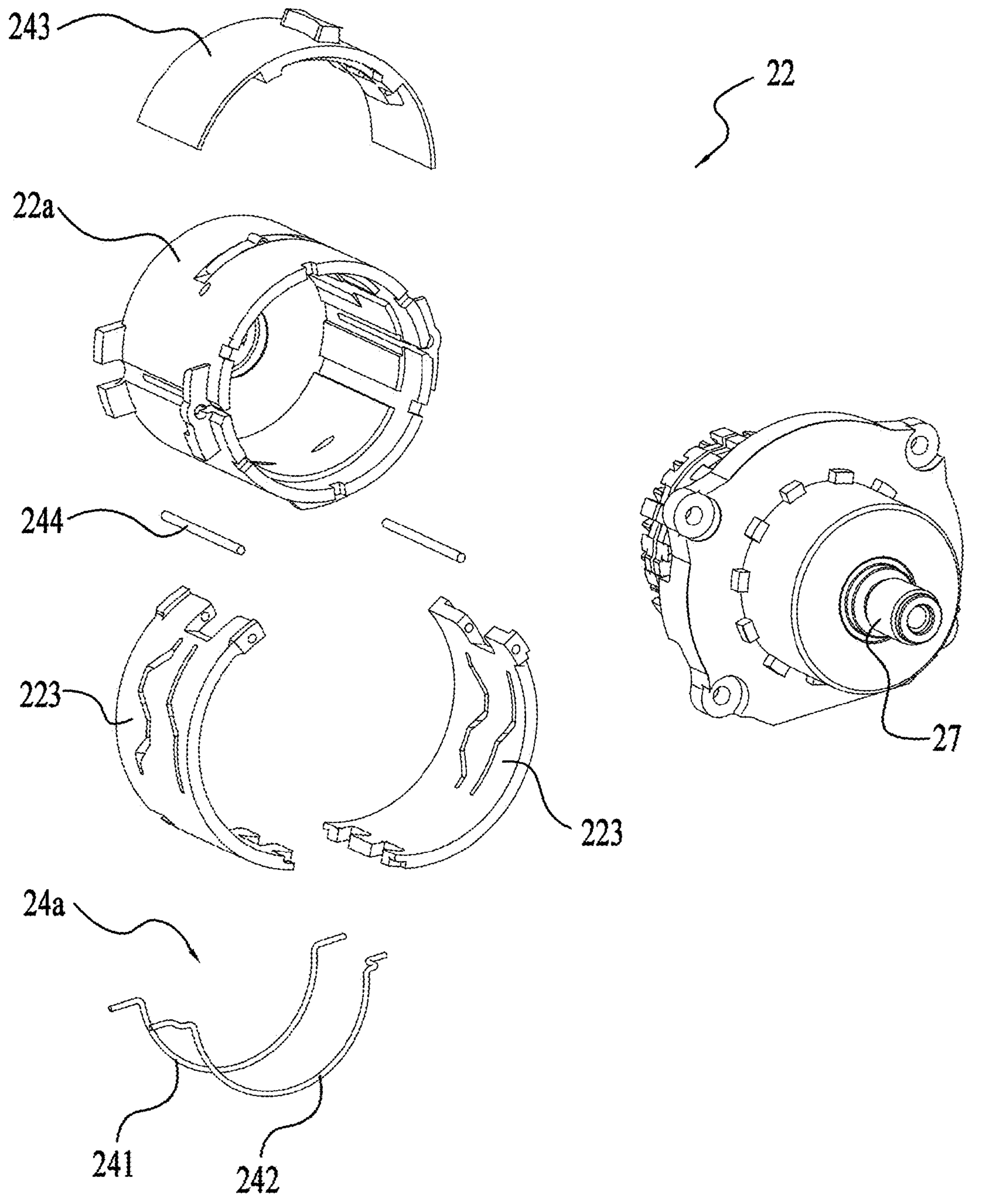
FIG. 15 is an exploded view of a transmission mechanism of FIG. 14.

FIG. 15 is an exploded view of the transmission mechanism 22. The transmission mechanism 22 includes a switching mechanism 24 configured to adjust a working mode of the transmission mechanism 22. The switching mechanism 24 includes an operating member 243, a gearbox body **22*a*, rail members 223, a shift fork group 24*a*, and positioning pins 244. The shift fork group 24*a* may include a first shift fork 241 and a second shift fork 242**.

The switching mechanism 24 includes only one operating member 243, and the unique operating member 243 may move between at least three positions to adjust the switching of the electric drill 200 between different speed modes. In this example, the operating member 243 may adjust the transmission mechanism 22 to a first mode, a second mode, or a third mode. When the transmission mechanism 22 is in the first mode, the electric drill 200 is in a high gear. When the transmission mechanism 22 is in the second mode, the electric drill 200 is in a low gear. When the transmission mechanism 22 is in the third mode, the electric drill 200 is in a first intermediate gear. In other alternative examples, in addition to the above gears, the electric drill 200 may be additionally adjusted to a fourth gear. The speed switching between different gears is described in detail below with reference to the internal structure of the transmission mechanism 22.

Figure 16:
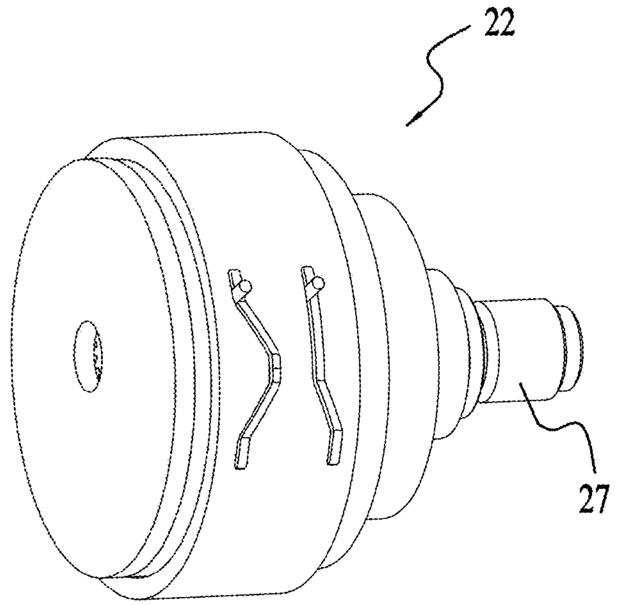
FIG. 16 is a simplified view of a transmission mechanism.
Figure 17:
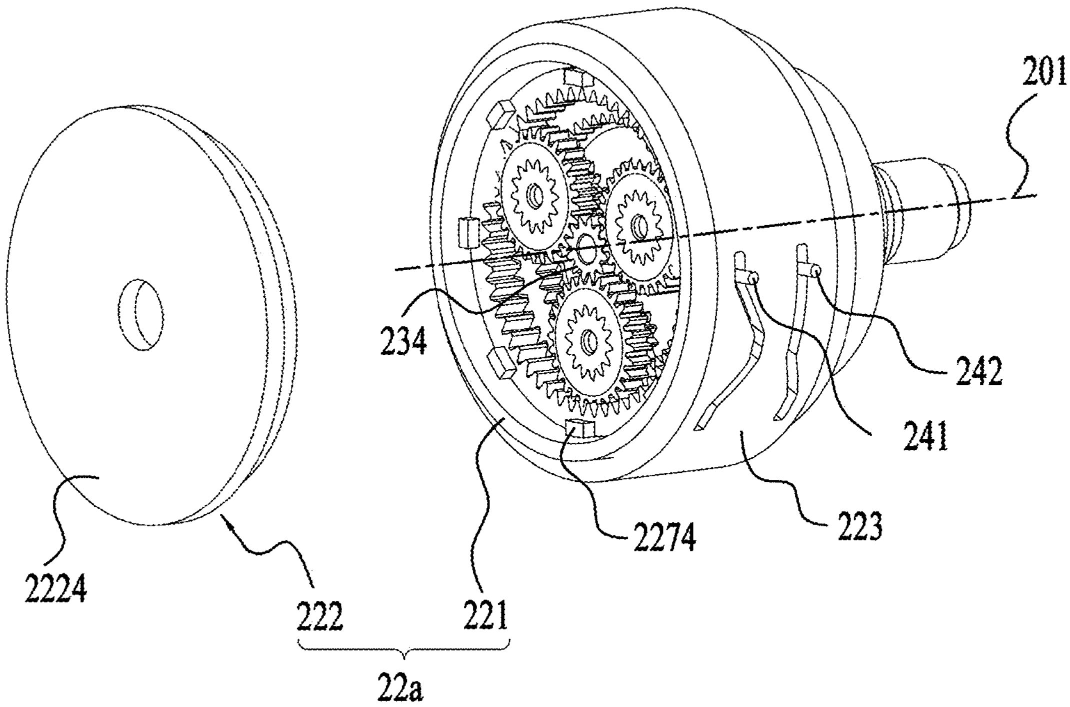
FIG. 17 is an interior view of the transmission mechanism of FIG. 16 with a gearbox cover opened.

FIGS. 16 and 17 are simplified views of the transmission mechanism in this example. To describe technical solutions of the present application more clearly, the specific structure of the transmission mechanism 22 disclosed in FIGS. 16 and 17 is described in detail below. As shown in FIG. 17, the gearbox body **22*a* includes a first housing 221 and a gearbox cover 222, and the gearbox cover 222 mates with the first housing 221 to provide a closed accommodation space for gear structures inside. The rail members 223 guide the movement of the first shift fork 241 and the second shift fork 242**, so as to adjust mating positions of gearset structures inside.

Figure 18:
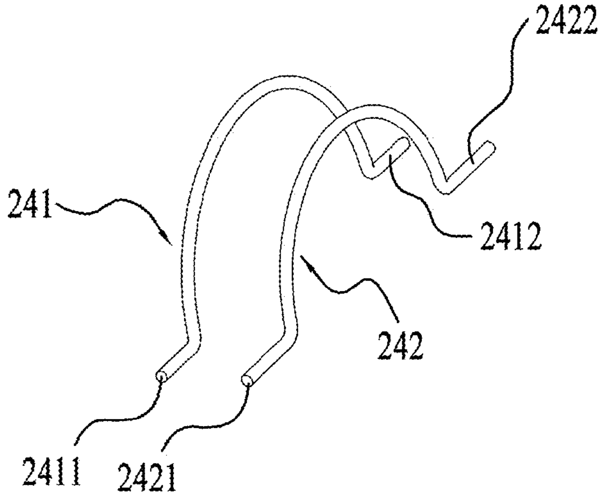
FIG. 18 is a schematic view of a shift fork group of FIG. 16.
Figure 19:
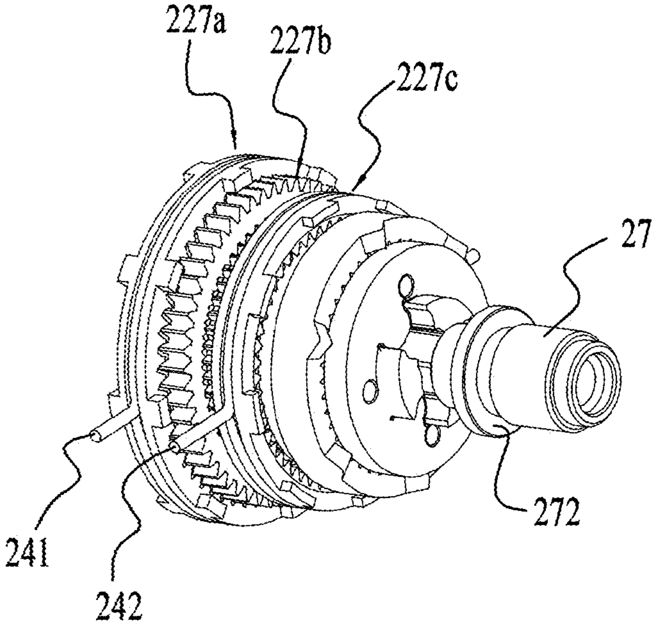
FIG. 19 is a schematic view of the transmission mechanism of FIG. 16 with a gearbox cover and a first housing removed.

As shown in FIGS. 18 and 19, the first shift fork 241 includes a first end 2411 and a second end 2412, and the second shift fork 242 includes a third end 2421 and a fourth end 2422. The first end 2411 and the third end 2421 are on the same side of the transmission mechanism 22, and the second end 2412 and the fourth end 2422 are on the other side of the transmission mechanism 22. The operating member 243 is shifted so that the ends of the shift fork group **24*a* on the same side slide along a rail member 223 to a certain position, so as to adjust the mating positions of the gearset structures inside the transmission mechanism 22**.

Figure 23:
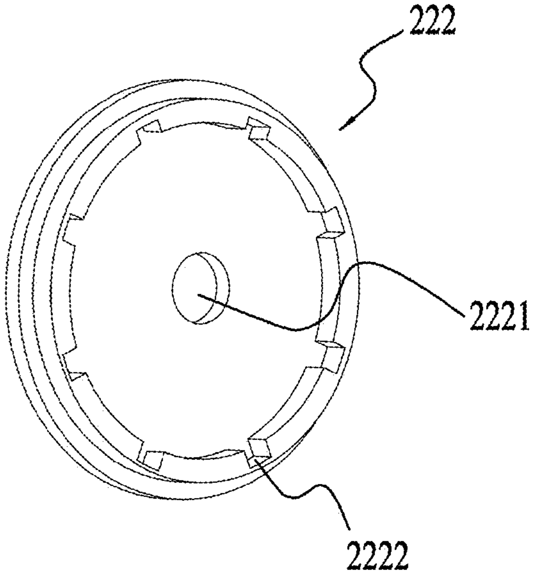
FIG. 23 is an exploded view of the gearbox cover of FIG. 17 from another perspective.

As shown in FIGS. 17 and 23, the gearbox cover 222 includes a first opening 2221. The motor shaft 231 of the electric motor 23 penetrates through the first opening 2221 of the gearbox cover 222 into the transmission mechanism 22 and then inputs torque through a first sun gear 234. The first sun gear 234 is formed at or connected to the front end of the motor shaft 231, and a specific connection manner is not limited here. A first axis 201 is along an axial direction of the first sun gear 234, and the first axis 201 basically coincides with both an axis of the motor shaft 231 and an axis of the output shaft 27.

Figure 20:
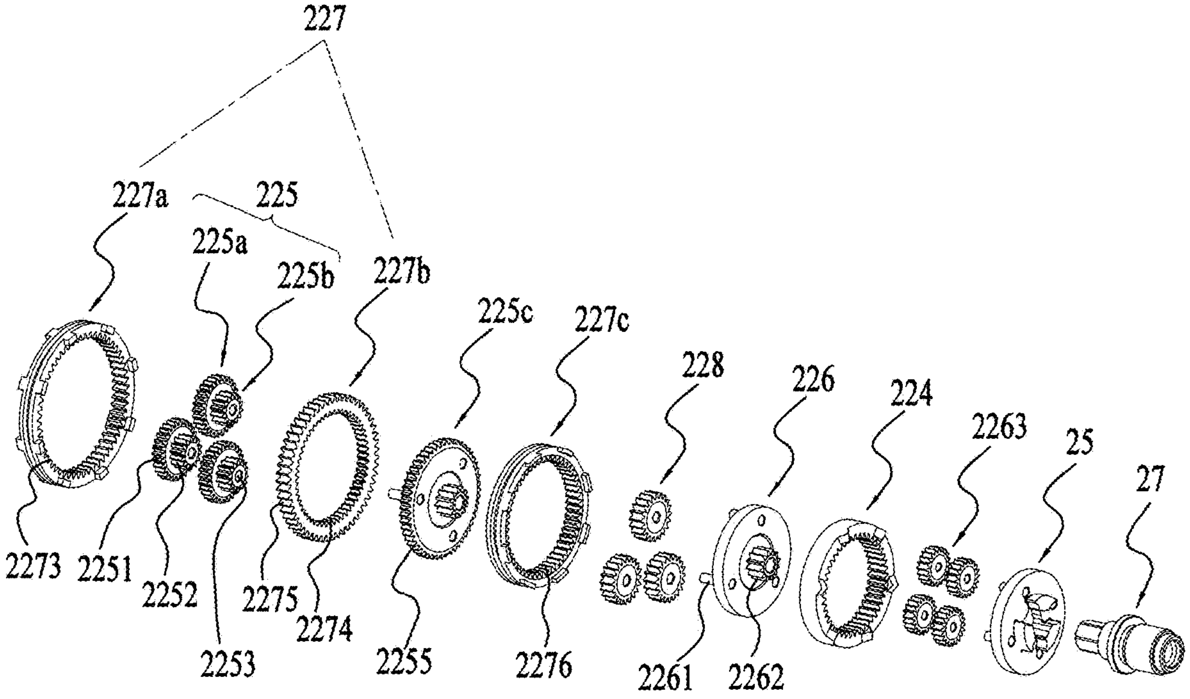
FIG. 20 is an exploded view of gear structures of FIG. 16 from a certain perspective.

FIG. 20 shows the gear structures inside the transmission mechanism 22 of this example. The transmission mechanism 22 includes a planetary gear set and includes or is connected to a clutch mechanism and a shaft lock structure. The transmission mechanism 22 includes at least a locking ring gear 224 in the clutch mechanism and a shaft lock frame 25 in the shaft lock structure. As shown in FIG. 20, the clutch mechanism is configured to adjust output torque of the transmission mechanism 22, and the shaft lock frame 25 and the corresponding shaft lock structure lock the output shaft when the output shaft transmits torque to the motor shaft.

Figure 21:
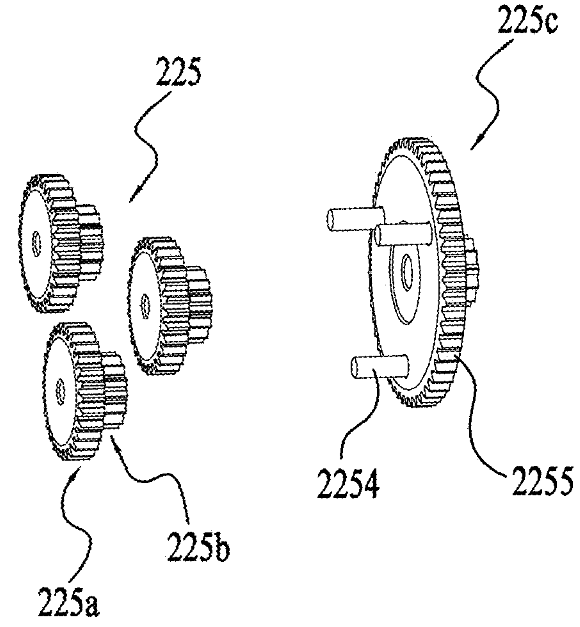
FIG. 21 is a schematic view of an example of composite planet gears and a first planet carrier.

As shown in FIGS. 20 and 21, first-stage planet gears **225*a* and second-stage planet gears 225*b* are embodied in the form of composite planet gears 225. A first support frame 2254 of a first planet carrier 225*c* penetrates through second openings 2253 of the composite planet gears 225, that is, the composite planet gears 225 are mounted on the first planet carrier 225*c*** to perform rotation.

Output torque of the motor shaft 231 is input to the transmission mechanism 22 through the first sun gear 234 and transmitted by the composite planet gears 225 to a second planet carrier 226 so that reduction can be implemented through the output at different gear ratios. The torque starts from a second sun gear 2262 of the second planet carrier 226, passes through the locking ring gear 224, fourth-stage planet gears 2263, and the shaft lock frame 25, and is output by the output shaft 27. This process is implemented in the same manner as that implemented by the clutch mechanism 15 and the torque adjustment mechanism 17 in the first example. The details are not repeated here.

In this example, a first-stage planet gear **225*a* and a second-stage planet gear 225*b* of a composite planet gear 225** are integrally formed and presented as one part in manufacturing.

Figure 22:
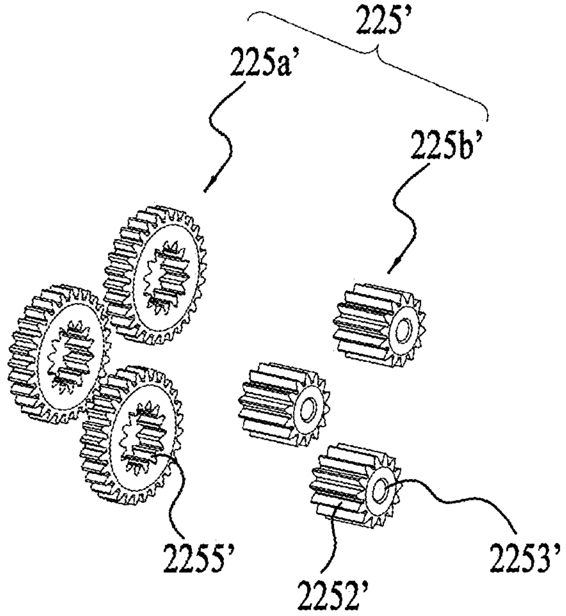
FIG. 22 is a schematic view of another example of composite planet gears.

In other alternative examples, as shown in FIG. 22, composite planet gears 225' include first-stage planet gears **225*a*' and second-stage planet gears 225*b*' that are separate and mate for use, that is, a second outer circumference 2252' of the second-stage planet gear 225*b*' mates with a second inner circumference 2255' of the first-stage planet gear 225*a*', and the first support frame 2254 penetrates through third openings 2253' of the second-stage planet gears 225*b*'. In this case, the first-stage planet gears 225*a*' and the second-stage planet gears 225*b*' are jointly mounted on the first planet carrier 225*c*** to perform rotation. It is to be understood that no matter whether the first-stage planet gear and the second-stage planet gear are integrally formed or separately formed, the technical feature of combining them for use is not affected and thus no limitation is made here. In practical application, the two gears may be integrally formed through powder metallurgy, which is cheaper than the formation and assembly of separate parts.

As shown in FIG. 20, the transmission mechanism 22 further includes a ring gear group 227 including a first-stage ring gear **227*a* and a second-stage ring gear 227*b*. A first inner circumference 2273 of the first-stage ring gear 227*a* may mesh with first outer circumferences 2251 of the first-stage planet gears 225*a*. A third inner circumference 2274 of the second-stage ring gear 227*b* meshes with second outer circumferences 2252 of the second-stage planet gears 225*b*. The first inner circumference 2273 of the first-stage ring gear 227*a* may completely mesh with a third outer circumference 2275 of the second-stage ring gear 227*b*. That is to say, the first-stage ring gear 227*a* and the second-stage ring gear 227*b* may be disengaged from or mesh with each other. The diameter of the third inner circumference 2274 of the second-stage ring gear 227*b* is less than the diameter of a fourth outer circumference 2255 of the first planet carrier 225*c*, so as to prevent a displacement of the second-stage ring gear 227*b* along a direction of the first axis 201 and prevent the second-stage ring gear 227*b*** from a forward displacement.

Figure 24:
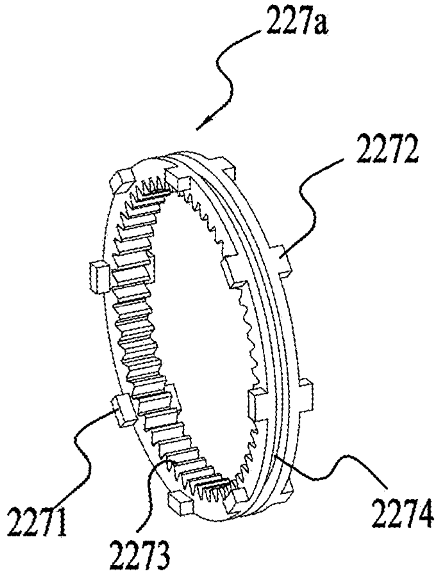
FIG. 24 is a schematic view of a first-stage ring gear of FIG. 20.
Figure 25:
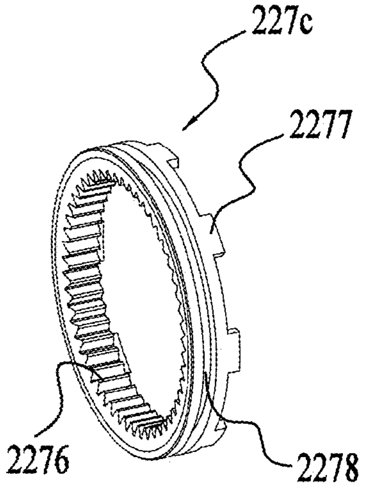
FIG. 25 is a schematic view of a third-stage ring gear of FIG. 20.

In conjunction with FIGS. 20, 24, and 25, the transmission mechanism 22 further includes third-stage planet gears 228 mounted on the second planet carrier 226 through a second support frame 2261 to perform rotation, and the third-stage planet gears 228 mesh with a third-stage ring gear **227*c***.

The first-stage ring gear **227*a* and the third-stage ring gear 227*c* each include a shift slot. The first-stage ring gear 227*a* includes a first shift slot 2279, and the third-stage ring gear 227*c* includes a second shift slot 2278, where the two shift slots are used for accommodating the shift fork group 24*a* that can be shifted. The first shift fork 241 is placed in the first shift slot 2279 of the first-stage ring gear 227*a*. The second shift fork 242 is placed in the second shift slot 2278 of the third-stage ring gear 227*c*. A positional state of the shift fork group 24*a* is changed so that positions of the first-stage ring gear 227*a* and the third-stage ring gear 227*c* are adjusted, thereby adjusting the mesh situation between the ring gear group 227** and planet gears.

Figure 26:
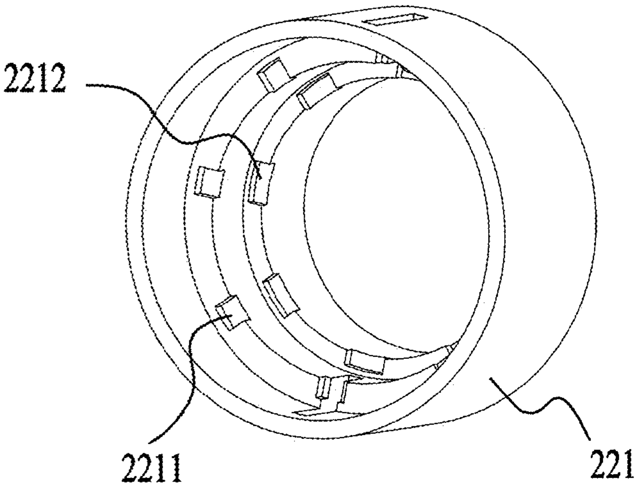
FIG. 26 is an interior view of a first housing of FIG. 17.

In conjunction with FIGS. 23 and 24, the gearbox cover 222 further includes first clamping slots 2222, and the first clamping slots 2222 basically match a first limiting portion 2271 of the first-stage ring gear **227*a*. When the first-stage ring gear 227*a* is moved such that the first limiting portion 2271 of the first-stage ring gear 227*a* enters the first clamping slots 2222, the first-stage ring gear 227*a* and the gearbox cover 222 are relatively stationary. In conjunction with FIGS. 24 and 26, the first housing 221 includes second clamping slots 2211 inside, and the second clamping slots 2211 basically match a second limiting portion 2272 of the first-stage ring gear 227*a*. When the first-stage ring gear 227*a* is moved such that the second limiting portion 2272 of the first-stage ring gear 227*a* enters the second clamping slots 2211, the first-stage ring gear 227*a* and the first housing 221 are relatively stationary. As shown in FIGS. 25 and 26, the third-stage ring gear 227*c* includes a third limiting portion 2277, the first housing 221 includes third clamping slots 2212 inside, and the third clamping slots 2212 basically match the third limiting portion 2277 of the third-stage ring gear 227*c*. When the third-stage ring gear 227*c* is moved such that the third limiting portion 2277 of the third-stage ring gear 227*c* enters the third clamping slots 2212, the third-stage ring gear 227*c* and the first housing 221 are relatively stationary. The first housing 221 is fixed to the housing 21 through a limiting rib on the housing 21, and the gearbox cover 222 may be fixed to the first housing 221** through screws or the like. Thus, when a limiting portion of a ring gear moves into clamping slots, the ring gear cannot rotate in practice.

Figure 27:
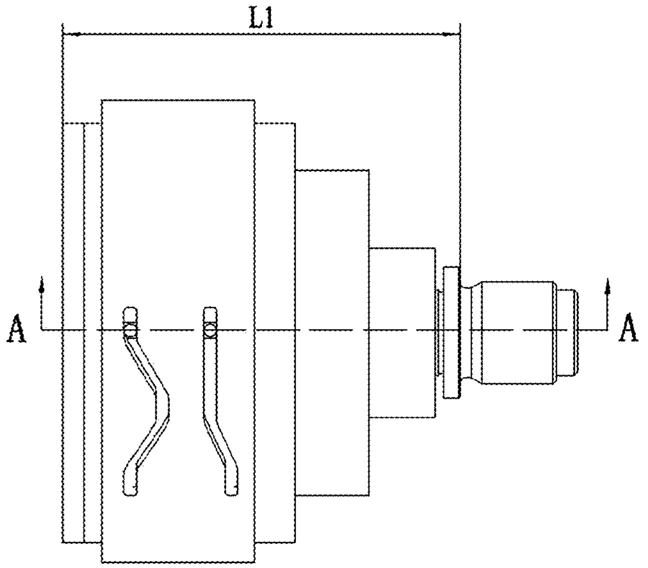
FIG. 27 is a side view of the transmission mechanism of FIG. 16 in a first mode.
Figure 28:
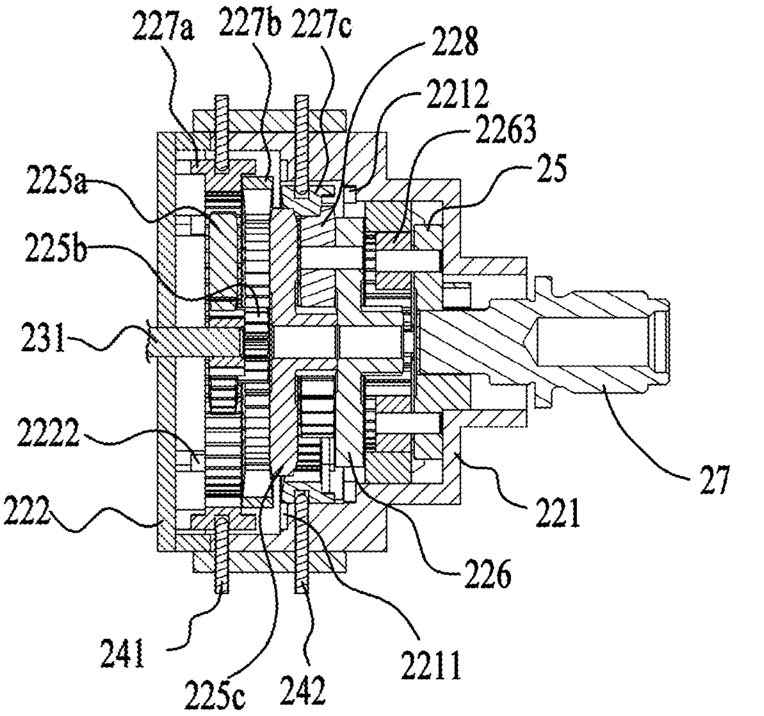
FIG. 28 is a sectional view of the transmission mechanism of FIG. 27 taken along A-A in the first mode.
Figure 29:
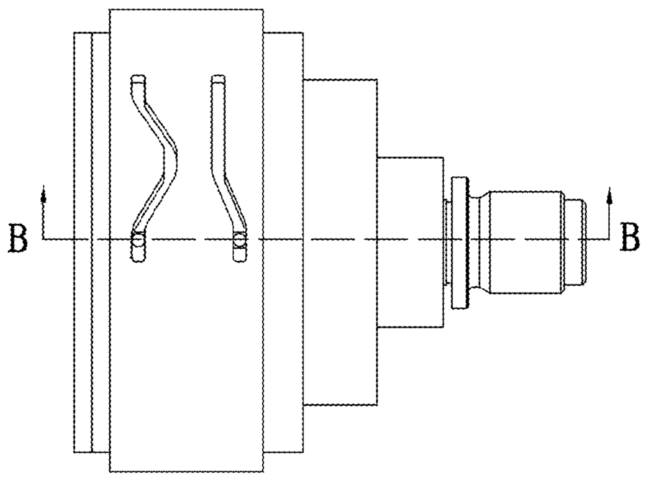
FIG. 29 is a side view of the transmission mechanism of FIG. 16 in a second mode.
Figure 30:
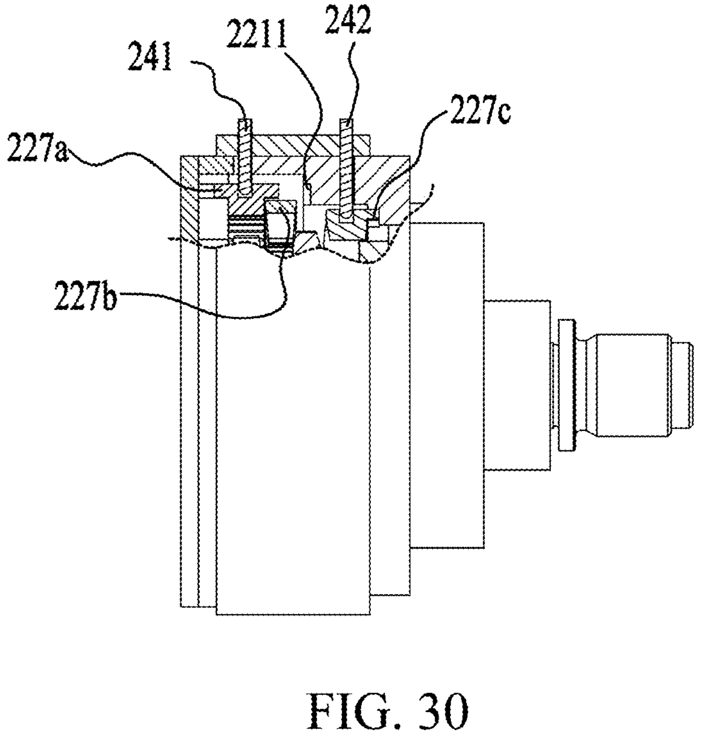
FIG. 30 is a partial sectional view of the transmission mechanism of FIG. 29 taken along B-B in the second mode.
Figure 31:
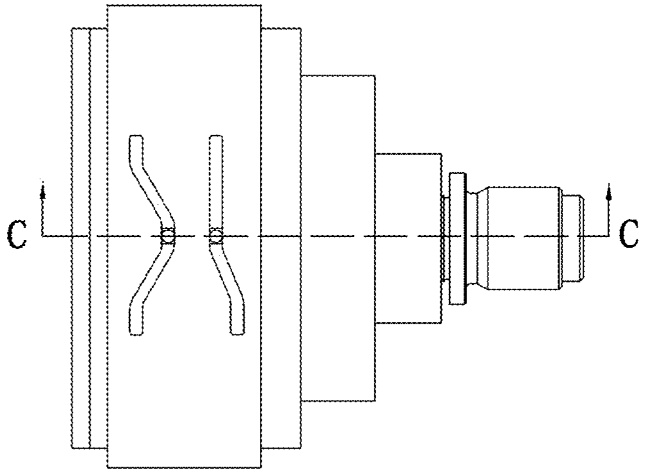
FIG. 31 is aside view of the transmission mechanism of FIG. 16 in a third mode.
Figure 32:
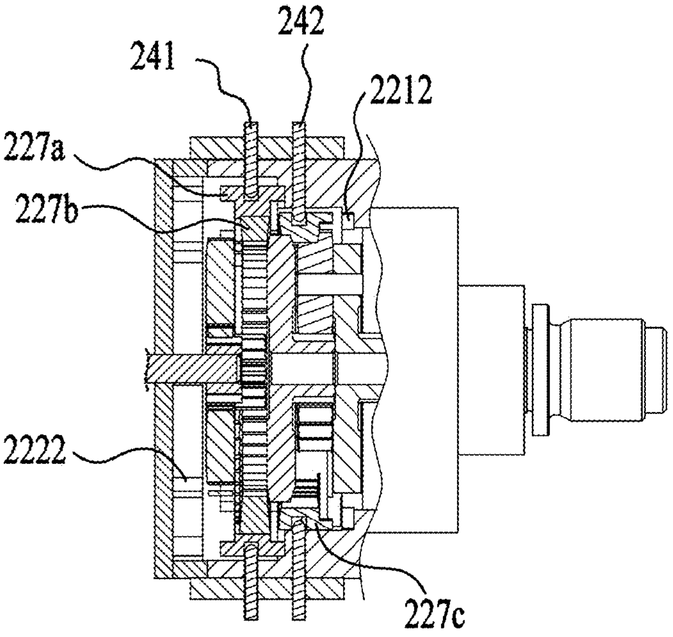
FIG. 32 is a partial sectional view of the transmission mechanism of FIG. 31 taken along C-C in the third mode.
Figure 33:
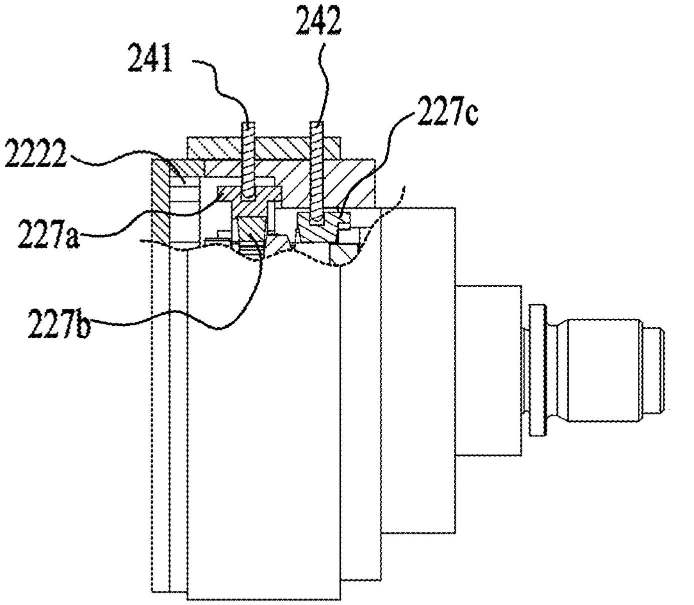
FIG. 33 is a partial sectional view of a transmission mechanism of FIG. 20 in a fourth mode.

FIGS. 27 to 34 are schematic views of the transmission mechanism 22 in four different speed modes. FIGS. 27 and 29 are side views of the transmission mechanism 22 in the first mode and the second mode, respectively. FIG. 31 may be a side view of the transmission mechanism 22 in the third mode or a fourth mode. FIG. 28 is a sectional view of the transmission mechanism 22 of FIG. 27 taken along A-A in the first mode. In this case, the transmission mechanism 22 outputs a minimum reduction ratio, and the electric drill 200 is in a high-speed mode. FIG. 30 is a partial sectional view of the transmission mechanism 22 of FIG. 29 taken along B-B in the second mode. In this case, the transmission mechanism 22 outputs a maximum reduction ratio, and the electric drill 200 is in a low-speed mode. FIG. 32 is a partial sectional view of the transmission mechanism 22 of FIG. 31 taken along C-C. In the two modes, intermediate reduction ratios between the maximum reduction ratio and the minimum reduction ratio are output. FIG. 33 is a partial sectional view of the transmission mechanism 22 in the fourth mode. The specific principles of the above modes are described in detail below.

FIGS. 27 and 28 are schematic views of the transmission mechanism 22 in the first mode. In conjunction with FIG. 20, the first-stage planet gears 225*a* and the second-stage planet gears 225*b* are jointly mounted on the first planet carrier 225*c* to perform rotation. In this mode, the first shift fork 241 controls the first inner circumference 2273 of the first-stage ring gear 227*a* to mesh with the first-stage planet gears 225*a*, and the first limiting portion 2271 of the first-stage ring gear 227*a* enters the first clamping slots 2222 of the gearbox cover 222. Since the gearbox cover 222 is fixed and cannot rotate, the first-stage ring gear 227*a* is also fixed and cannot rotate. In this case, the first-stage ring gear 227*a* is activated, and the first-stage ring gear 227*a* and the first-stage planet gears 225*a* meshing with the first-stage ring gear 227*a* jointly implement reduction transmission. At the same time, the first-stage ring gear 227*a* is disengaged from the second-stage ring gear 227*b*. When the second-stage planet gears 225*b* rotate, the second-stage ring gear 227*b* rotates together with the second-stage planet gears 225*b*. In this case, the second-stage ring gear 227*b* always rotates idly with the second-stage planet gears 225*b*, which is equivalent to an inactivated state of the second-stage ring gear 227*b*. Moreover, in this mode, the second shift fork 242 controls the third-stage ring gear 227*c* not to enter the third clamping slots 2212 of the first housing 221, and the third-stage planet gears 228 always mesh with the third-stage ring gear 227*c* which rotates with the third-stage planet gears 228 mounted on the second planet carrier 226. In this case, the third-stage ring gear 227*c* always rotates with the third-stage planet gears 228, which is equivalent to an inactivated state of the third-stage ring gear 227*c*. Therefore, in the first mode, only the first-stage ring gear 227*a* implements the reduction transmission, the second-stage ring gear 227*b* and the third-stage ring gear 227*c* are in a rotating state, and the transmission mechanism 22 provides a first reduction ratio. The first mode is the high-speed mode of the electric drill 200.

FIGS. 29 and 30 are schematic views of the internal structure of the transmission mechanism 22 in the second mode. In conjunction with FIG. 20, the first-stage planet gears 225*a* and the second-stage planet gears 225*b* are jointly mounted on the first planet carrier 225*c* to perform rotation. In this mode, the first shift fork 241 controls the first inner circumference 2273 to mesh with the first-stage planet gears 225*a*, and the first limiting portion 2271 of the first-stage ring gear 227*a* enters the first clamping slots 2222 of the gearbox cover 222. When the gearbox cover 222 is fixed and cannot rotate, the first-stage ring gear 227*a* is also fixed and cannot rotate. In this case, the first-stage ring gear 227*a* is activated, and the first-stage ring gear 227*a* and the first-stage planet gears 225*a* meshing with the first-stage ring gear 227*a* jointly implement the reduction transmission. The second-stage ring gear 227*b* meshes with the second-stage planet gears 225*b*. When the second-stage planet gears 225*b* rotate, the second-stage ring gear 227*b* rotates together with the second-stage planet gears 225*b*. In this case, the second-stage ring gear 227*b* always rotates with the second-stage planet gears 225*b*, which is equivalent to the inactivated state of the second-stage ring gear 227*b*. In this mode, the second shift fork 242 controls the third-stage ring gear 227*c* to enter the third clamping slots 2212 of the first housing 221, and the third-stage ring gear 227*c* cannot rotate. The third-stage planet gears 228 mesh with the third-stage ring gear 227*c*, and the reduction transmission of the third-stage ring gear 227*c* is activated. Therefore, in the second mode, both the first-stage ring gear 227*a* and the third-stage ring gear 227*c* implement the reduction transmission, and the transmission mechanism 22 provides a second reduction ratio, where the second reduction ratio is higher than the first reduction ratio. The second mode is the low-speed mode of the electric drill 200.

FIGS. 31 and 32 are schematic views of the internal structure of the transmission mechanism 22 in the third mode. In conjunction with FIG. 20, the first-stage planet gears 225*a* and the second-stage planet gears 225*b* are jointly mounted on the first planet carrier 225*c* to perform rotation. In this mode, the first shift fork 241 controls the first inner circumference 2273 of the first-stage ring gear 227*a* to be disengaged from the first-stage planet gears 225*a* and causes the second limiting portion 2272 of the first-stage ring gear 227*a* to enter the second clamping slots 2211 of the first housing 221. At the same time, the first inner circumference 2273 of the first-stage ring gear 227*a* meshes with the third outer circumference 2275 of the second-stage ring gear 227*b*. Since the first-stage ring gear 227*a* cannot rotate, the second-stage ring gear 227*b* cannot rotate. In this case, the second-stage ring gear 227*b* and the second-stage planet gears 225*b* meshing with the second-stage ring gear 227*b* jointly perform reduction transmission. Meanwhile, the second shift fork 242 controls the third-stage ring gear 227*c* not to enter the third clamping slots 2212 of the first housing 221 so that the third-stage ring gear 227*c* can rotate, the third-stage ring gear 227*c* always rotates together with the third-stage planet gears 228, and the reduction transmission is not activated. Therefore, in the third mode, only the second-stage ring gear 227*b* implements the reduction transmission, and for the output of the motor shaft 231, a reduction ratio generated by the second-stage ring gear 227*b* and the second-stage planet gears 225*b* meshing with the second-stage ring gear 227*b* is greater than the reduction ratio generated by the first-stage ring gear 227*a* and the first-stage planet gears 225*a* meshing with the first-stage ring gear 227*a* and less than the reduction ratio generated through the joint reduction of the first-stage ring gear 227*a* and the first-stage planet gears 225*a* meshing with the first-stage ring gear 227*a* and the third-stage ring gear 227*c* and the third-stage planet gears 228 meshing with the third-stage ring gear 227*c*. That is, the transmission mechanism 22 provides a third reduction ratio greater than the first reduction ratio and less than the second reduction ratio. That is to say, in this mode, the transmission mechanism 22 provides the third reduction ratio between the first reduction ratio and the second reduction ratio, and the third mode is an intermediate speed mode of the electric drill 200.

In some examples, the transmission mechanism 22 further includes the fourth mode. FIG. 33 shows a schematic view of the internal structure of the transmission mechanism 22 in the fourth mode. A corresponding position of the shift fork group 24*a* relative to the rail members 223 of the transmission mechanism 22 is not shown. In conjunction with FIG. 20, the first-stage planet gears 225*a* and the second-stage planet gears 225*b* are jointly mounted on the first planet carrier 225*c* to perform rotation. In this mode, the first shift fork 241 controls the first inner circumference 2273 of the first-stage ring gear 227*a* to be disengaged from the first-stage planet gears 225*a*, and the second limiting portion 2272 of the first-stage ring gear 227*a* enters the second clamping slots 2211 of the first housing 221 so that the first-stage ring gear 227*a* cannot rotate. Since the first inner circumference 2273 of the first-stage ring gear 227*a* meshes with the third outer circumference 2275 of the second-stage ring gear 227*b*, the second-stage ring gear 227*b* cannot rotate. The first-stage ring gear 227*a* meshes with the second-stage ring gear 227*b*. When the second-stage planet gears 225*b* rotate, the second-stage ring gear 227*b* is activated to implement reduction transmission. In this mode, the second shift fork 242 controls the third-stage ring gear 227*c* to enter the third clamping slots 2212 of the first housing 221, the third-stage ring gear 227*c* cannot rotate, the third-stage planet gears 228 always mesh with the third-stage ring gear 227*c*, and the third-stage ring gear 227*c* is activated to implement reduction transmission. Therefore, in the fourth mode, the second-stage ring gear 227*b* fixed by the first-stage ring gear 227*a* is activated, the second-stage ring gear 227*b* and the third-stage ring gear 227*c* jointly implement the reduction transmission, and the transmission mechanism 22 provides a fourth reduction ratio. In this example, the fourth reduction ratio is greater than the second reduction ratio.

In conclusion, the electric drill 200 uses three stages and four layers of planet gears and is adjusted between four speed modes.

No matter which working mode the electric drill 200 is in, the first-stage planet gears 225*a* and the second-stage planet gears 225*b* are always mounted on the first planet carrier 225*c* in the form of the composite planet gears 225. The position of the first-stage ring gear 227*a* or the second-stage ring gear 227*b* is adjusted such that only one of the first-stage ring gear 227*a* and the second-stage ring gear 227*b* is in an activated state and the other is in the inactivated state at the same time. Additionally, in conjunction with the adjustment of the third-stage ring gear 227*c* between the activated state and the inactivated state, the whole electric drill 200 achieves three or more output reduction ratios for the user to select from. Moreover, the first-stage planet gears 225*a* and the second-stage planet gears 225*b* are jointly mounted on the first planet carrier 225*c* instead of being mounted on two separate planet carriers, thereby saving the space of one planet carrier and avoiding an excessively large dimension of the electric drill 200 along the first axis 201. In this example, as shown in FIG. 17, the gearbox cover 222 of the transmission mechanism 22 includes a rear end face 2224. As shown in FIG. 19, the output shaft 27 includes a front end face 272. As shown in FIG. 27, the first distance L1 between the rear end face 2224 and the front end face 272 is less than 70 mm.

It is to be noted that the example disclosed in FIGS. 16 to 33 only presents an application manner where the first-stage ring gear 227*a* is movable to mesh with or be disengaged from the second-stage ring gear 227*b*; and in other examples, the second-stage ring gear 227*b* may be movable to mesh with or be disengaged from the first-stage ring gear 227*a*. Compared with the technical solution of the related art where the first-stage ring gear 227*a* and the second-stage ring gear 227*b* can be shifted separately, the manner of the present application where one ring gear is fixed and the other ring gear is shifted further shortens the axial length of gearbox reduction and makes the length even shorter than an axial length of gearbox reduction of a torque output tool with double-speed adjustment.

When the movable ring gear is changed, for example, the structure involved in this example is adjusted to that the first-stage ring gear 227*a* is fixed and the second-stage ring gear 227*b* is movable, the specific structures of the gearbox cover 222 and the first housing 221 need to be adjusted, and even the housing structure of the transmission mechanism 22 is re-planned without affecting the core technical solutions of the present application.

Figure 34:
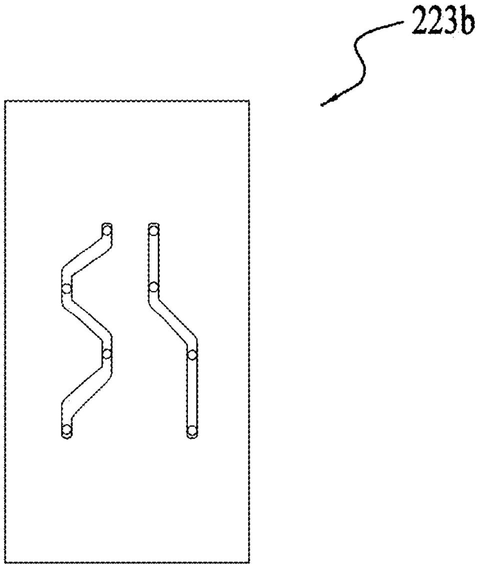
FIG. 34 shows another example of a rail member of FIG. 15.

When the transmission mechanism 22 is adjusted to the fourth mode, a shape of the rail member 223 required for guiding the rotation of the shift fork group 24*a* is different from the shape when the transmission mechanism 22 has only three reduction modes. FIG. 34 is a schematic view of a rail member 223*b* of the electric drill 200 with four modes. In practical application, the specific shape and form of the rail member 223 may change without affecting the technical core of the present application.

In the three modes disclosed in FIGS. 27 to 32, when rotational power is transmitted from the motor shaft 231 to the output shaft 27, the transmission mechanism 22 forms at least three reduction ratios in total. Specifically, when the transmission mechanism 22 is in the first mode, a first rotational speed output by the output shaft 27 is greater than 1800 rpm and less than 3200 rpm. When the transmission mechanism 22 is in the second mode, a second rotational speed output by the output shaft 27 is greater than 300 rpm and less than 600 rpm. When the transmission mechanism 22 is in the third mode, a third rotational speed output by the output shaft 27 is greater than 800 rpm and less than 1500 rpm.

What is claimed is:

1. A power tool, comprising:

an electric motor comprising a motor shaft rotating about a first axis;

an output mechanism comprising an output shaft rotating about an output axis and configured to output power;

a transmission mechanism configured to transmit power between the electric motor and the output mechanism; and a clutch mechanism configured to, when torque transmitted from the output shaft to the transmission mechanism exceeds a set threshold of output torque of the power tool, prevent the output shaft from being driven through the transmission mechanism;

wherein the transmission mechanism is provided with at least three transmission gear positions for making the output shaft output different rotational speeds, such that the transmission mechanism has at least a first transmission gear position that enables the output shaft to output a first rotational speed, a second transmission gear position that enables the output shaft to output a second rotational speed, and a third transmission gear position that enables the output shaft to output a third rotational speed, the transmission mechanism comprises three-stage planetary gear sets, the three-stage planetary gear sets comprises a first-stage planetary gear set closest to the motor shaft, a second-stage planetary gear set, and a third-stage planetary gear set closest to the output mechanism, the second-stage planetary gear set is disposed between the first-stage planetary gear set and the third-stage planetary gear set, each stage of the three-stage planetary gear sets comprises one layer of planet gears in an axial direction, a number of stages of the three-stage planetary gear sets is less than or equal to the number of transmission positions, and, among the three-stage planetary gear sets, when a gear ratio of a planetary gear set of the three-stage planetary gear sets is 1, the planetary gear set is in a drive state, and when the gear ratio of the planetary gear set is greater than 1, the planetary gear set is in a variable state, a first-stage planetary gear set closest to the motor shaft comprises a first drive state and a first variable state, and one stage of remaining planetary gear sets is connected to the clutch mechanism;

wherein the second-stage planetary gear set comprises a second drive state and a second variable state, the third-stage planetary gear set comprises a third drive state and a third variable state; when the transmission mechanism is in the first transmission gear position, the first-stage planetary gear set is in the first variable state, the second-stage planetary gear set is in the second drive state, and the third-stage planetary gear set is in the third variable state.

2. The power tool of claim 1, wherein the transmission mechanism further comprises a housing assembly, the first-stage planetary gear set, the second-stage planetary gear set, and the third-stage planetary gear set are at least partially disposed in the housing assembly, and a distance between a rear end face of the housing assembly and a front end of the output shaft is less than or equal to 70 mm.

3. The power tool of claim 1, wherein each stage of the three-stage planetary gear sets comprises a planet carrier driven to rotate by the planet gears, and a number of layers of planet gears is less than or equal to a number of planet carriers.

4. The power tool of claim 2, wherein the first-stage planetary gear set comprises a plurality of first planet gears and a first inner ring gear meshing with the plurality of first planet gears, the first inner ring gear is fixed when the first-stage planetary gear set is in the first variable state, and the first inner ring gear rotates synchronously with a first planet carrier when the first-stage planetary gear set is in the first drive state.

5. The power tool of claim 4, wherein the housing assembly comprises a first cover configured to accommodate a first bearing supporting the motor shaft, the first inner ring gear is prevented from rotating by a locking portion disposed on the first cover when the first-stage planetary gear set is in the first variable state, and the locking portion releases the first inner ring gear when the first-stage planetary gear set is in the first drive state.

6. The power tool of claim 5, wherein the housing assembly further comprises a first housing, the first-stage planetary gear set is at least partially accommodated in the first housing, and the first cover extends along a direction perpendicular to the first axis and is mounted at an end of the first housing facing the electric motor.

7. The power tool of claim 6, wherein the first housing and the first cover are detachably connected by first fasteners which extend along a direction perpendicular to the first axis.

8. The power tool of claim 4, wherein the motor shaft is formed with or connected to a first sun gear, and the plurality of first planet gears externally mesh with the first sun gear.

9. The power tool of claim 1, wherein the third-stage planetary gear set is connected to the clutch mechanism.

10. The power tool of claim 1, wherein the third-stage planetary gear set comprises a plurality of third planet gears and a third inner ring gear meshing with the plurality of third planet gears, and the third inner ring gear comprises limiting teeth abutting against the clutch mechanism, the clutch mechanism comprises lock pins abutting against the limiting teeth of the third inner ring gear and configured to prevent the third inner ring gear from rotating and a biasing element configured to bias the lock pins so that the lock pins apply to the third inner ring gear a locking force for preventing rotation of the third inner ring gear.

11. The power tool of claim 10, wherein the third-stage planetary gear set comprises a third variable state in which the third inner ring gear is prevented from rotating, and the clutch mechanism prevents the transmission mechanism from driving the output shaft to output torque when the third inner ring gear rotates with the plurality of third planet gears.

12. The power tool of claim 11, further comprising a torque adjustment device configured to set the set threshold of output torque of the power tool.

13. The power tool of claim 1, wherein a first output rotational speed of the output shaft is greater than 2000 rpm, a second output rotational speed of the output shaft is greater than 1500 rpm and less than 2500 rpm, and a third output rotational speed of the output shaft is greater than 400 rpm and less than 1000 rpm.

14. A power tool, comprising:

an electric motor comprising a motor shaft rotating about a first axis;

an output mechanism comprising an output shaft rotating about an output axis and configured to output power; and a transmission mechanism configured to transmit power between the electric motor and the output mechanism;

wherein the transmission mechanism is provided with at least three transmission gear positions for making the output shaft output different rotational speeds, such that the transmission mechanism has at least a first transmission gear position that enables the output shaft to output a first rotational speed, a second transmission gear position that enables the output shaft to output a second rotational speed, and a third transmission gear position that enables the output shaft to output a third rotational speed, the transmission mechanism comprises three-stage planetary gear sets, each stage of the three-stage planetary gear sets comprises at least one layer of planet gears in an axial direction, the three-stage planetary gear sets comprises a first-stage planetary gear set closest to the motor shaft, a second-stage planetary gear set, and a third-stage planetary gear set closest to the output mechanism, the second-stage planetary gear set is disposed between the first-stage planetary gear set and the third-stage planetary gear set, among the three-stage planetary gear sets, a first-stage planetary gear set closest to the motor shaft comprises a plurality of first planet gears and a first inner ring gear meshing with the plurality of first planet gears, the first inner ring gear is configured to move between a first position and a second position, and the first inner ring gear is prevented from rotating and a gear ratio of the first-stage planetary gear set is not equal to 1 when the first inner ring gear is at the first position, the second-stage planetary gear set comprises a plurality of second planet gears and a second inner ring gear meshing with the plurality of second planet gears, and the power tool further comprises an operating member for a user to operate to drive the first inner ring gear and the second inner ring gear to move, and wherein the second-stage planetary gear set comprises a second drive state and a second variable state, the third-stage planetary gear set comprises a third drive state and a third variable state; and when the transmission mechanism is in the first transmission gear position, the first-stage planetary gear set is in the first variable state, the second-stage planetary gear set is in the second drive state, and the third-stage planetary gear set is in the third variable state.

15. A power tool, comprising:

an electric motor comprising a motor shaft rotating about a first axis;

an output mechanism comprising an output shaft rotating about an output axis and configured to output power;

a transmission mechanism configured to transmit power between the electric motor and the output mechanism provided with at least three transmission gear positions for making the output shaft output different rotational speed, such that the transmission mechanism has at least a first transmission gear position that enables the output shaft to output a first rotational speed, a second transmission gear position that enables the output shaft to output a second rotational speed, and a third transmission gear position that enables the output shaft to output a third rotational speed, and the transmission mechanism comprises three-stage planetary gear sets and each stage of the three-stage planetary gear sets, namely a first-stage planetary gear set, a second-stage planetary gear set, and a third-stage planetary gear set, comprises planet gears and an inner ring gear; and a housing assembly comprising a first cover configured to accommodate a first bearing supporting the motor shaft;

wherein among the three-stage planetary gear sets, at least two inner ring gears are axially movable and are respectively locked onto different components;

wherein among the three-stage planetary gear sets, a first-stage planetary gear set closest to the motor shaft has a first drive state and a first variable state, and the first-stage planetary gear set comprises a plurality of first planet gears and a first inner ring gear meshing with the plurality of first planet gears, the first inner ring gear is prevented from rotating by a locking portion disposed on the first cover when the first-stage planetary gear set is in the first variable state, and the locking portion releases the first inner ring gear when the first-stage planetary gear set is in the first drive state, and wherein the second-stage planetary gear set comprises a second drive state and a second variable state, the third-stage planetary gear set comprises a third drive state and a third variable state; and when the transmission mechanism is in the first transmission gear position, the first-stage planetary gear set is in the first variable state, the second-stage planetary gear set is in the second drive state, and the third-stage planetary gear set is in the third variable state.

16. The power tool of claim 15, wherein the housing assembly further comprises a first housing, the first-stage planetary gear set is at least partially accommodated in the first housing, and the first cover extends along a direction perpendicular to the first axis and is mounted at an end of the first housing facing the electric motor, the locking portion is formed on or connected to the first cover and is at least partially accommodated in the first housing.

17. The power tool of claim 1, wherein the first-stage planetary gear set comprises a plurality of first planet gears and a first inner ring gear meshing with the plurality of first planet gears, the second-stage planetary gear set comprises a plurality of second planet gears and a second inner ring gear meshing with the plurality of second planet gears, the third-stage planetary gear set couples the clutch mechanism, the power tool further comprises a first shift fork connected to the first inner ring gear, a second shift fork for driving the second inner ring gear, and an operating member for a user to operate to drive the first shift fork and the second shift fork.

18. The power tool of claim 1, wherein when the transmission mechanism is in the second transmission gear position, the first-stage planetary gear set is in the first drive state, the second-stage planetary gear set is in the second variable state, and the third-stage planetary gear set is in the third variable state.

19. The power tool of claim 1, wherein when the transmission mechanism is in the third transmission gear position, the first-stage planetary gear set is in the first variable state, the second-stage planetary gear set is in the second variable state, and the third-stage planetary gear set is in the third variable state.

* * * * *